US012556923B2

(12) United States Patent
Doan

(10) Patent No.: US 12,556,923 B2
(45) Date of Patent: Feb. 17, 2026

(54) ACCESS CONTROL DEVICE COMMUNICATION SYSTEM

(71) Applicant: Rivian IP Holdings, LLC, Irvine, CA (US)

(72) Inventor: Jack Doan, Addison, TX (US)

(73) Assignee: Rivian IP Holdings, LLC, Irvine, CA (US)

( * ) Notice: Subject to any disclaimer, the term of this patent is extended or adjusted under 35 U.S.C. 154(b) by 610 days.

(21) Appl. No.: 17/735,225

(22) Filed: May 3, 2022

(65) Prior Publication Data

US 2023/0362644 A1 Nov. 9, 2023

(51) Int. Cl.
| | |
|---|---|
| *H04L 9/32* | (2006.01) |
| *H04W 12/03* | (2021.01) |
| *H04W 12/08* | (2021.01) |
| *H04W 12/50* | (2021.01) |

(52) U.S. Cl.
CPC .......... *H04W 12/08* (2013.01); *H04W 12/03* (2021.01); *H04W 12/50* (2021.01)

(58) Field of Classification Search
CPC ...... H04W 12/08; H04W 12/50; H04W 12/03
USPC ......................................................... 713/171
See application file for complete search history.

(56) References Cited

U.S. PATENT DOCUMENTS

| | | | | |
|---|---|---|---|---|
| 2015/0116078 | A1* | 4/2015 | Mishra ................... | G07C 9/257 340/5.51 |
| 2017/0140592 | A1* | 5/2017 | Plüss ................... | G07C 9/00563 |
| 2017/0257767 | A1* | 9/2017 | Zhao ................... | H04L 12/6418 |
| 2018/0326947 | A1* | 11/2018 | Oesterling ............ | B60R 25/241 |
| 2020/0375457 | A1* | 12/2020 | Van Tassel ............ | H04W 76/14 |
| 2023/0362649 | A1* | 11/2023 | Landberger ........... | H04L 63/123 |

* cited by examiner

*Primary Examiner* — Jeffrey C Pwu
*Assistant Examiner* — Samuel Ambaye
(74) *Attorney, Agent, or Firm* — Foley & Lardner LLP

(57) ABSTRACT

At least one aspect is directed to a system. The system can include a data processing system that can generate a first pairing data bundle for an access control device of a vehicle. The data processing system can generate a second pairing data bundle for a sensor of the vehicle. The data processing system can transmit the first pairing data bundle to the access control device and transmit the second pairing data bundle to the sensor to pair the access control device with the sensor.

19 Claims, 13 Drawing Sheets

ACCESS CONTROL DEVICE COMMUNICATION SYSTEM

INTRODUCTION

A vehicle, such as an electric vehicle, may be powered by a battery of the vehicle. Components of the vehicle can perform various operations.

SUMMARY

An access control device (e.g., a key-fob) can wirelessly communicate with sensors of a vehicle (e.g., an electric vehicle) to transmit commands to the vehicle. The commands can include commands to lock the vehicle or unlock the vehicle. The access control device can pair with sensors of the vehicle. A system can generate pairing data bundles and transmit the pairing data bundles to the access control device and the sensors of the vehicle. The system can generate the pairing data bundles to include encryption keys or addresses read from the devices by the system. The system can transmit the pairing data bundles to the access control device and the sensors via wired or wireless connections. Furthermore, the sensors and the access control device can store the pairing data bundles. The access control device and the sensor can store the pairing data bundles, causing the devices to become paired so that wireless communication between the access control device and the sensor can occur. This solution can reduce the number of pairing errors that may occur during pairing, and can reduce the amount of time to perform the pairing.

At least one aspect is directed to a system. The system can include a data processing system including one or more processors, coupled to memory. The data processing system can generate a first pairing data bundle for an access control device of a vehicle. The data processing system can generate a second pairing data bundle for a sensor of the vehicle. The data processing system can transmit the first pairing data bundle to the access control device and transmit the second pairing data bundle to the sensor to pair the access control device with the sensor.

At least one aspect is directed to a method. The method can include an act of generating, by a data processing system including one or more processors coupled to memory, a first pairing data bundle for an access control device of a vehicle. The method can include an act of generating, by the data processing system including one or more processors coupled to memory, a second pairing data bundle for a sensor of the vehicle. The method can include an act of transmitting, by the data processing system, the first pairing data bundle to the access control device and transmitting, by the data processing system, the second pairing data bundle to the sensor to pair the access control device with the sensor.

At least one aspect is directed to a system including a data processing system comprising one or more processors, coupled to memory. The data processing system can generate a first pairing data bundle and a second pairing data bundle. The data processing system can transmit the first pairing data bundle to the access control device. The data processing system can transmit an update including the second pairing data bundle to the vehicle to locally store the second pairing data bundle on the vehicle to pair the sensor with the access control device.

At least one aspect is directed to a method. The method can include an act of generating, by a data processing system comprising one or more processors, coupled to memory, a first pairing data bundle and a second pairing data bundle.

The method can include an act of transmitting, by the data processing system, the first pairing data bundle to the access control device. The method can include an act of transmitting, by the data processing system, an update including the second pairing data bundle to the vehicle to locally store the second pairing data bundle on the vehicle to pair the sensor with the access control device.

At least one aspect is directed to a vehicle. The vehicle includes a sensor to communicate with an access control device that stores a first pairing data bundle generated by a system. The vehicle includes a data processing system comprising one or more processors, coupled to memory. The data processing system can receive a second pairing data bundle from the system. The data processing system can cause the sensor to store the second pairing data bundle to pair the access control device with the sensor.

At least one aspect is directed to a vehicle. The vehicle includes a sensor to communicate with an access control device that stores a first pairing data bundle generated by a system. The vehicle includes a data processing system comprising one or more processors, coupled to memory. The data processing system can receive an update from the system, the update including a second pairing data bundle. The data processing system can implement the update to cause the sensor to locally store the second pairing data bundle to pair the sensor with the access control device.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
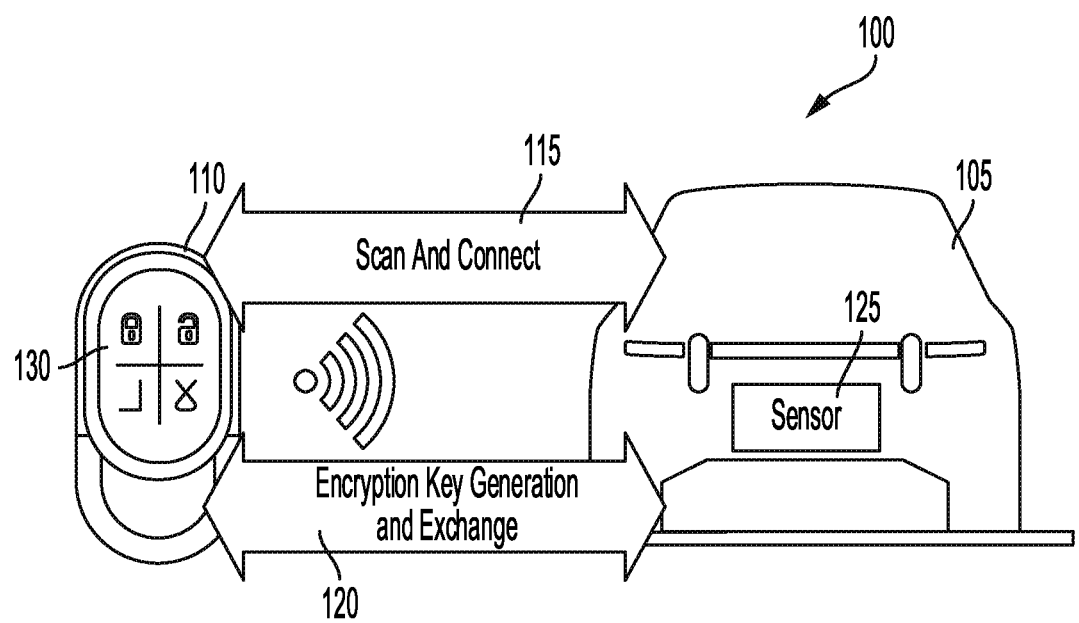
FIG. 1 depicts an example system including an access control device and an electric vehicle.

Following below are more detailed descriptions of various concepts related to, and implementations of, methods, apparatuses, and systems of pairing an access control device with sensors of a vehicle. The various concepts introduced above and discussed in greater detail below may be implemented in any of numerous ways.

An access control device (e.g., a key-fob) can communicate with sensors of a vehicle such as an electric vehicle to transmit commands to the electric vehicle. The access control device and the sensors of the electric vehicle may communicate wirelessly via wireless communication protocols such as Bluetooth, near field communication (NFC), Zigbee, personal area network protocols, or non-network protocols. The wireless communication can include on-off keying (OOK), frequency-shift keying (FSK), phase-shift keying (PSK), radio frequency identification (RFID). The commands can include commands to lock the vehicle, unlock the vehicle, open or close a door, hood, trunk, cargo space, tailgate, charging port, gas tank, sunroof, skylight, window, or operate other component of the vehicle such as headlights, mirrors, or windshield wipers. The commands can also include commands to operate the infotainment system, radio, or other computing device of the vehicle, park the vehicle, unpark the vehicle, switch between a mobilized and an immobilized state, or turn the vehicle on or off. The access control device can pair with the sensors of the vehicle. Once paired, the access control device can transmit the commands to the electric vehicle.

The access control device and the electric vehicle can enter a pairing mode where the devices exchange encryption keys, addresses such as a media access control (MAC) address, or other pieces of pairing data to pair the access control device with the vehicle. This direct pairing process between the access control device and the electric vehicle can be error prone and can take a significant amount of time. For example, the pairing may fail because an access control device and the electric vehicle do not establish communication properly, or because the access control device and the sensor do not properly exchange keys or addresses. These errors can result from wireless signal strength issues between the access control device and the sensor. For example, environmental features (e.g. objects) can block wireless signals or reduce wireless signal strength. For a large number of sensors or multiple access control devices, the likelihood of a pairing failure can increase since multiple pairings may be performed. The pairing process may need to be attempted multiple times before the access control devices and the sensors of the vehicle are paired. Furthermore, when the access control devices and the sensors enter the pairing mode, the devices may not exclusively communicate with each other, for example and a third party system may attempt to communicate with the access control devices or the sensors.

To solve these and other technical problems, the technical solution described herein can include a system that generates pairing data bundles and transmits the pairing data bundles to the access control device and the sensors of the vehicle. This solution can reduce the number of pairing errors that may occur during pairing, and can reduce the amount of time to perform the pairing. The technical solutions described herein can avoid or bypass the pairing mode and can reduce the likelihood of pairing difficulties. The system can generate the pairing data bundles to include encryption keys or addresses read from the devices by the system. The system can transmit the pairing data bundles via wired or wireless connections. By using a wired connection, wireless signal strength issues that can occur during pairing are reduced or eliminated. The system can transmit a pairing data bundle to the access control device and the access control device can store the pairing data bundle. The system can also transmit a pairing data bundle to the sensor and the sensor can store the pairing data bundle. When the access control device and the sensor store the pairing data bundles, the devices may become paired and secure communication between the access control device and the sensor can occur. The pairing data bundle stored on the access control device can include addresses of sensors of the electric vehicle and encryption keys of the sensors generated by the system. The pairing data bundle stored on the access control device can include an encryption key of the access control device generated by the system. The pairing data bundle stored on the sensor can include addresses of one or multiple access control devices and encryption keys of the access control devices generated by the system. The pairing data bundle stored on the sensors can include encryption keys of the respective sensors generated by the system. The encryption key can be shared between an access control device and a sensor. For example, a single encryption key can be used by both the access control device and the sensor to encrypt and decrypt messages. In this example, the system can cause the access control device and the sensor to store the same encryption key.

The system can generate one pairing data bundle to pair an access control device with a sensor and another pairing data bundle to pair the sensor with the access control device. The system can generate a pair of pairing data bundles for each relationship between the access control device and a sensor. One pairing data bundle can form a relationship between two devices. For an access control device that is paired with five sensors, the system can generate five pairing data bundles to pair the access control device with each of the sensors. Five sensors is an example and any number of pairings can be performed. The system can transmit the five pairing data bundles to the access control device to be stored. A pairing data bundle can include sub-bundles. One pairing data bundle for pairing the access control device with multiple sensors could include sub-pairing data bundles for pairing the access control device with each of the multiple sensors. The system could transmit the sub-pairing data bundles together in a single pairing data bundle to the access control device or sensor. The system can transmit the sub-pairing data bundles to the access control device in separate data packets.

The system can include at least one jig for the access control device. The jig can make electrical connections with the access control device allowing the system to transmit a pairing data bundle to the access control device. The system can be connected to the electric vehicle via a communication connection, e.g., via On-Board Diagnostics (OBD). The system can transmit a pairing data bundle to the vehicle via the communication connection.

FIG. 1 depicts an example system 100 including at least one access control device 110 and at least one vehicle 105. The vehicle 105 can be or include an electric vehicle, hybrid, or internal combustion engine vehicle that includes at least one sensor 125. The sensor 125 can include a module having one or more radios, amplifiers, transmitters, receivers, transceivers, filters, or data processing systems. The sensor 125 can include or be part of an electronic control unit (ECU). The sensor 125 can include one or multiple processors, microprocessors, modules, or other computing systems. The sensor 125 can include a data processing system such as the exemplary data processing system shown for example in FIG. 13. The access control device 110 can include one or more radios, amplifiers, transmitters, receivers, transceivers, filters, or data processing systems. The access control device 110 can be a key-fob. The access control device 110 can be or include a tag or card. The access control device 110 can include a smartphone, tablet, computing device, personal digital assistant, laptop, desktop, server, or other computer device. The access control device 110 and the sensor 125 of the vehicle 105 can communicate wirelessly. The access control device 110 and the sensor 125 can wirelessly communicate via a communications protocol such as Bluetooth, e.g., Bluetooth Low Energy (BLE), zigbee, Wi-Fi, or NFC.

The access control device 110 can include at least one user interface 130 such as at least one button. Via the user interface, the access control device 110 can operate the vehicle 105. The access control device 110 can wirelessly send a command to operate a component of the vehicle to the sensor 125 via a pairing between the access control device and the sensor. Responsive to a user pressing a button (or otherwise actuating the user interface 130) of the access control device 110, a command can be communicated to the sensor 125. The sensor 125 can communicate the command to a data processing system of the vehicle 105. Based on the command, the data processing system of the electric vehicle can lock, unlock, open, close, or operate doors, a hood, a trunk, windows, a tailgate motor, an infotainment system, or other component of the vehicle 15, or can cause the vehicle 105 to park in a parking spot, or return to the user from a parking spot. The data processing system can transmit a message to the access control device via the sensor 125. The sensor 125 can transmit the message based on the pairing data bundle 240. For example, the message could be encrypted based on an encryption key of the second pairing data bundle 240 or be transmitted to an address indicated by the second pairing data bundle 240. The message could be an acknowledgement (ACK) of the command or a negative-acknowledgement (NACK) of the command.

The access control device 110 and the sensor 125 can be paired before the access control device 110 and the sensor 125 can wirelessly communicate. The access control device 110 and the vehicle 105 can enter into a pairing mode. For example, a user can enter the access control device 110 and the vehicle 105 into the pairing mode. For example, a user such as an owner of the vehicle 105, a driver of the vehicle 105, an individual that manufactures the vehicle 105, or an individual that provisions (e.g., loads software onto) the vehicle 105, can cause the access control device 110 and the sensor 125 to enter into a pairing mode. For example, a user can hold down one or multiple buttons of the access control device 110 for a predefined amount of time to cause the access control device 110 to enter into the pairing mode. The user can press one or more buttons on a control dashboard of the vehicle 105 to cause the sensor 125 to enter into the pairing mode. A system can communicate with the vehicle 105 and cause the vehicle 105 or the sensor 125 to enter into the pairing mode. For example, the system can connect with the vehicle 105 via an On-Board Diagnostics (OBD) connection. The system can send a command over OBD to cause the vehicle 105 or the sensor 125 to enter a pairing mode.

Responsive to entering the pairing mode, the access control device 110 and the sensor 125 can perform an operation 115. The access control device 110 can scan and connect with the sensor 125. The sensor 125 can scan and connect with the access control device 110. Scanning and connecting can include broadcasting, by a device, identifying information and searching, by the device, for any other broadcast identifying information of another device. Responsive to the access control device 110 and the sensor 125 scanning and connecting, the access control device 110 and the sensor 125 can perform an operation 120. The access control device 110 can transmit an address and an encryption key stored by the access control device 110 to the sensor 125 via wireless communication. The sensor 125 can store the address and the encryption key responsive to receiving the address and the encryption key from the access control device 110. The address can be an address unique to the access control device 110. The encryption key can be a key unique to the access control device 110. The sensor 125 can transmit an address and an encryption key stored by the sensor 125 to the access control device 110. The access control device 110 can store the address and the encryption key responsive to receiving the address and the encryption key from the sensor 125. The address can be an address unique to the sensor 125. The encryption key can be a key unique to the sensor 125.

The addresses can include MAC addresses. The addresses can include static addresses or dynamic addresses. The encryption keys can be a public key or a private keys. The encryption keys can symmetric encryption keys or asymmetric encryption keys. Responsive to the access control device 110 storing the address and encryption key of the sensor 125 and the sensor 125 storing the address and encryption key of the access control device 110, the access control device 110 and the sensor 125 can be paired. The access control device 110 and the sensor 125 can exit pairing modes responsive to storing the addresses and the encryption keys. The access control device 110 and the sensor 125 can perform a power cycle. The pairing data bundles stored on the access control device 110 and the sensor 125 can be persistent and remain stored on the access control device 110 and the sensor 125 after the power cycle. Responsive to booting up, the access control device 110 and the sensor 125 can initiate wireless communication via the exchanged keys and addresses.

The vehicle 105 can include multiple sensors 125. The vehicle 105 can also be paired with multiple access control devices 110. During a manufacturing or provisioning process, the sensors 125 and the access control devices 110 can be paired. For example, the vehicle 105 can include three key-fobs and five sensors. To manufacture or provision the vehicle 105, the three key-fobs can be paired with the five sensors, for a total of fifteen pairings. Fifteen pairings is an example, and there can be more or fewer than fifteen total pairings depending on the number of access control devices 110 and the number of sensors 125. The systems and methods described herein can improve the speed and reliability at which pairings are made between the access control devices 110 and the sensors 125. By bypassing the operations 115 and 120 and generating and injecting pairing data bundles into the access control device 130 and the sensor 125, the speed and reliability of the pairings between the access control devices 110 and the sensors 125 can be improved.

The access control device 110 can be a computing system of a user device that runs an application. The computing system can be a smartphone, a laptop, or a tablet. The application run on the computing system can provide various user interfaces that allow a user to view a status of the vehicle 105 or send commands to the vehicle 105. For example, a user can interact with a user interface element of the user interface and cause the access control device 110 to transmit the command to the sensor 125. The application or the computing device can be paired with the sensor 125.

Figure 2:
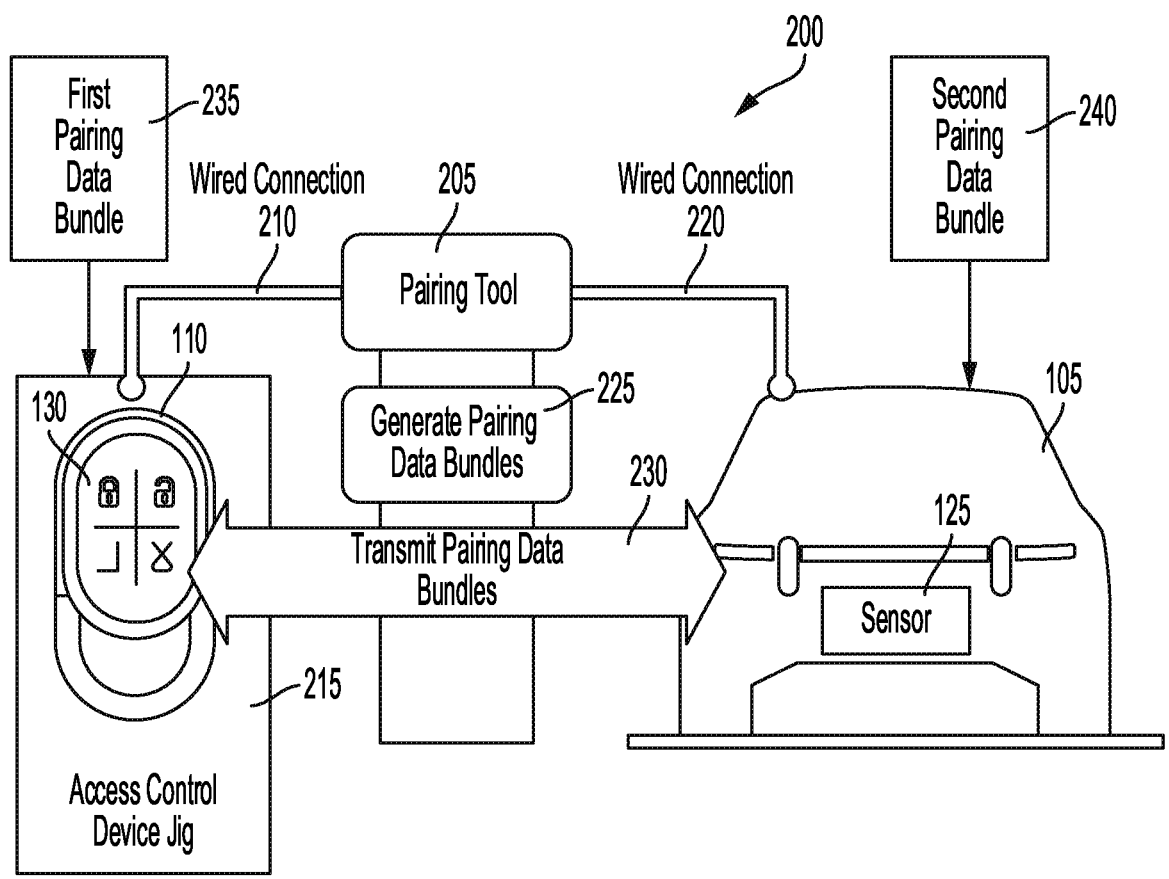
FIG. 2 depicts an example system including a pairing tool that pairs the access control device and the electric vehicle.

FIG. 2 depicts an example system 200 including at least one pairing tool 205 that can pair the access control device 110 with the vehicle 105 or with components thereof such as at least one sensor 125. The pairing tool 205 can connect with the vehicle 105 via a wired connection 220. The pairing tool 205 can communicate with one or more data processing systems of the vehicle 105 via the wired connection 220. The pairing tool 205 can transmit data to the vehicle 105 via the wired connection 220. The pairing tool 205 can transmit data to the sensor of the vehicle 105 via the wired connection 220. The pairing tool 205 can receive data from the vehicle 105 via the wired connection. The pairing tool 205 can receive data from the sensor 125. The wired connection 220 can include an Ethernet connection, an RS-485 connection, universal asynchronous receiver-transmitter (UART), controller area network (CAN) connection, a USB connection. The wired connection 220 can implement OBD or OBD2. The wired connection 220 can include one or more wires or network components. The connection 220 can also include wireless, e.g., Bluetooth, Wi-Fi, zigbee, or NFC connections.

The pairing tool 205 can connect with the access control device 110 via a wired connection 210. The pairing tool 205 can communicate with one or more data processing systems of the access control device 110 via the wired connection 210. The pairing tool 205 can transmit data to the access control device 110 via the wired connection 220. The pairing tool 205 can receive data from the access control device 110 via the wired connection. The wired connection 210 can be an Ethernet connection, an RS-485 connection, a USB connection, a USB-C connection, or a serial connection. The wired connection 210 can include one or more wires or network components. Instead of the connection 210 being wired, the connection 210 can be wireless, e.g., Bluetooth, Wi-Fi, zigbee, or NFC.

The system 200 can include at least one access control device jig 215. The jig 215 can be structured to hold the access control device 110. The jig 215 include one or more contacts that make connections with one or more contacts of the access control device 110. The jig 215 can power the access control device 110 via the connections. The jig 215 can transmit data to the access control device 110 via the connections. The jig 215 can receive data from the access control device 110 via the connections. The jig 215 can interface with the wired connection 210 to connect the pairing tool 205 with the access control device 110. The jig 215 can be a pneumatically actuated jig. The jig 215 can receive or eject the access control device 110 via one or more pneumatically actuated components of the jig 215. The jig 215 can hold and connect with multiple access control devices 110 simultaneously and pair the multiple access control devices 110 with the sensor 125 simultaneously. The jig 215 can load firmware onto the access control device 110.

The pairing tool 205 can perform an operation 225 to generate a first pairing data bundle 235 for the access control device 110. Via the jig 215, the access control device 110 or the sensor 125 can generate and exchange the pairing data bundle 235 and the pairing data bundle 240. The jig 215 can load firmware onto the access control device 110. The pairing tool 205 can generate a second pairing data bundle 240 for the sensor 125. The pairing tool 205 can generate the first pairing data bundle 235 and the second pairing data bundle 240 to pair the access control device 110 with the sensor 125. The first pairing data bundle 235 and the second pairing data bundle 240 can include data for performing wireless communication by the access control device 110 and the sensor 125. The first pairing data bundle 235 and the second pairing data bundle 240 can include one or more encryption keys, addresses (e.g., MAC addresses), flags (MAC address type, encryption key type, attribute flag), or other boding data.

The pairing tool 205 can generate an encryption key for the access control device 110. Once paired, the access control device 110 can use the encryption key to encrypt messages that the access control device 110 transmits to the sensor 125. The sensor 125 can use the encryption key to decrypt the messages that the access control device 110 transmits to the sensor 125. Similarly, the pairing tool 205 can generate an encryption key for the sensor 125. Once paired, the sensor 125 can use the encryption key to encrypt messages that the sensor 125 transmits to the access control device 110. The access control device 110 can use the encryption key to decrypt the messages that the sensor 125 transmits to the access control device 110. The pairing tool 205 can perform a pseudo-random encryption key generation. The pairing tool 205 can be pre-loaded with encryption keys (e.g., previously identified prime numbers). The pairing tool 205 can implement a pseudo-random number generator to generate the encryption keys. The pairing tool 205 can perform a Key Derivation Function (KDF) to generate the encryption keys from a secret value or from secret values. The KDF can generate the encryption key through a cryptographic hash function or a block cipher.

The pairing tool 205 can generate the first pairing data bundle 235 for the access control device 110 to include an encryption key of the sensor 125. Furthermore, the pairing tool 205 can generate the first pairing data bundle 235 for the access control device 215 to include an encryption key of the access control device 110. The pairing tool 205 can generate the second pairing data bundle 240 for the sensor 125 to include the encryption key of the access control device 110. Furthermore, the pairing tool 205 can generate the second pairing data bundle 240 for the sensor 125 to include the encryption key of the sensor 125.

Figure 6:
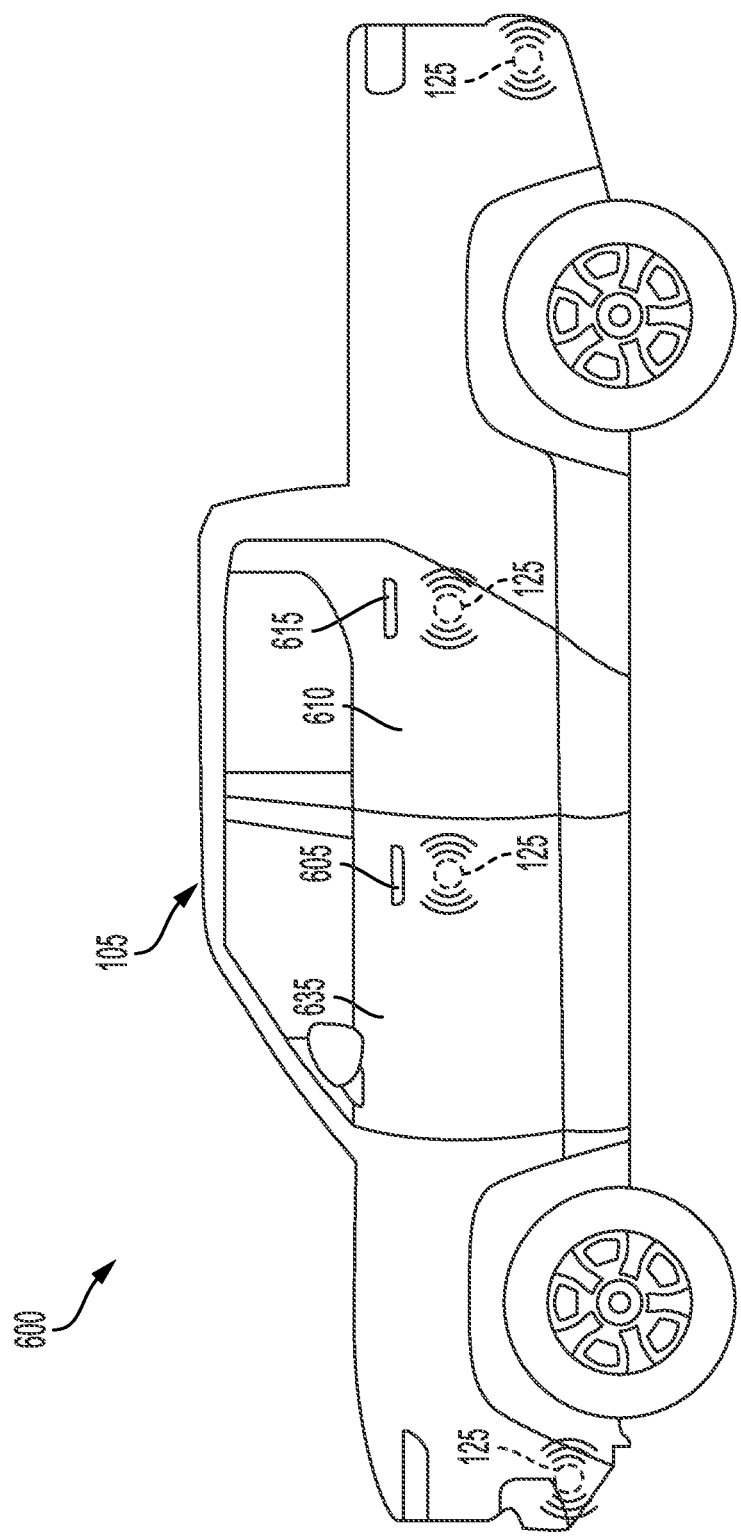
FIG. 6 depicts an example electric vehicle including sensors that communicate with the access control device.

The vehicle 105 can include multiple sensors 125, as in FIG. 1 and FIG. 6, among others. The pairing tool 205 can generate an encryption key for each of the sensors 125. The pairing tool can generate a pairing data bundle for each respective sensor of the sensors 125. Each respective pairing bundle can include an encryption key of the respective sensor of the sensors 125. For example, a first encryption key of a first sensor can be included in a pairing data bundle for the first sensor. A second encryption key of a second sensor can be included in a pairing data bundle for the second sensor. The pairing data bundles can include the encryption key of the sensor that the pairing data bundle is generated for, without including any other encryption keys. The first pairing data bundle 235 for the access control device 110 can include the encryption key of all of the sensors 125. The pairing data bundle can include the first encryption key of the first sensor and the encryption key of the second sensor.

The pairing tool 205 can generate the first pairing data bundle 235 for the access control device 110 and the second pairing data bundle 240 for the sensor 125 to include one or more addresses. The addresses can be an address of the access control device 110 or an address of the sensor 125. The addresses can be loaded onto the access control device 110 or the sensor 125 during a manufacturing or provisioning process of the access control device 110 or the sensor 125. The pairing tool 205 can cause the first pairing data bundle 235 of the access control device 110 to include an address of the sensor 125. The pairing tool 205 can cause the second pairing data bundle 240 of the sensor 125 to include an address of the access control device 110.

The pairing tool 205 can determine, via the wired connection 210, an address of the access control device 110. The pairing tool 205 can communicate with the access control device 110 to read, retrieve, or otherwise receive the address of the access control device 110 via the wired connection 210. The access control device 110 can store addresses (e.g., the access control device's own address and the address of the sensor 125) on a memory device of the access control device 110. The address can be stored on the memory device of the access control device 110 by a manufacturing system, via a provisioning system, or by another system or user. The address can be stored on the access control device 110 via a previous pairing process where the access control device 110 was previously paired with another sensor. The pairing tool 205 can generate the second pairing data bundle 240 for the sensor 125 to include the address of the access control device 110 received by the pairing tool 205 via the wired connection 210.

The pairing tool 205 can determine, via the wired connection 220, an address of the sensor 125. The pairing tool 205 can communicate with the sensor 125 to read, retrieve, or otherwise receive the address of the sensor 125 via the wired connection 220. The address of the sensor 125 can be stored on a memory device of the sensor 125. The address can be stored on the memory device of the sensor 125 by a manufacturing system, via a provisioning system, or by another system or user. The address can be stored on the sensor 125 via a previous pairing process wherein the sensor 125 was previously paired with another access control device. The pairing tool 205 can generate the first pairing data bundle 235 for the access control device 110 to include the address of the sensor 125 received by the pairing tool 205 via the wired connection 220.

The pairing tool 205 can determine an address of a second sensor of the electric vehicle. Although the vehicle 105 is shown to include a single sensor 125 in FIG. 2, the vehicle 105 can include multiple sensor, e.g., as shown in the example of FIG. 6. The pairing tool 205 can receive the address of the second sensor via the wired connection 220. The pairing tool 205 can generate the first pairing data bundle 235 of the access control device 110 to include the address of the second sensor. The pairing tool 205 can generate the first pairing data bundle 235 of the access control device 110 to include both the address of the sensor 125 and the address of the second sensor.

The pairing tool 205 can generate addresses for the access control device 110 and the sensor 125. For example, the pairing tool 205 can generate a Bluetooth private address. The pairing tool 205 can generate the addresses via a pseudo-random number generator. The pairing tool 205 can store a record of addresses of previously paired access control devices and sensors of vehicles. The pairing tool 205 can generate a new addresses that is not in the record. The data pairing tool 205 can cause the first pairing data bundle 235 of the access control device 110 to include the generated address of the access control device 110 and the generated address of the sensor 125. Furthermore, the data pairing tool 205 can cause the first pairing data bundle 235 to include any other generated or received addresses of other sensors of the vehicle 105 when the vehicle 105 includes multiple sensors 125. The data pairing tool 205 can cause the second pairing data bundle 240 of the sensor 125 to include the generated address of the sensor 125 and the generated address of the access control device 110. Furthermore, the data pairing tool 205 can cause the second pairing data bundle 240 to include any other generated or received addresses of other access control devices of the vehicle 105 when the vehicle 105 includes multiple access control devices.

The pairing tool 205 can perform an operation 230 to transmit the pairing data bundles to the access control device 110 and the sensor 125. The pairing tool 205 can transmit the first pairing data bundle 235 for the access control device 110 to the access control device 110. The pairing tool 205 can transmit the second pairing data bundle 240 of the sensor 125 to the sensor 125 to pair the access control device with the sensor 125. Responsive to the access control device 110 storing the first pairing data bundle 235 and the sensor 125 storing the second data paring bundle, the access control device 110 and the sensor 125 may be paired. The pairing tool 205 can transmit the first pairing data bundle 235 to the access control device 110 with a command to store the first pairing data bundle 235. Responsive to receiving the first pairing data bundle 235 and the command, the access control device 110 can store the first pairing data bundle 235. The pairing tool 205 can transmit the second pairing data bundle 240 to the sensor 125 with a command to store the second pairing data bundle 240. Responsive to receiving the second pairing data bundle 240 and the command, the sensor 125 can store the second pairing data bundle 240. The pairing tool 205 can communicate (e.g., transmit) the first pairing data bundle 235 for the access control device 110 via the wired connection 210. The pairing tool 205 can communicate (e.g., transmit) the second pairing data bundle 240 for the sensor 125 to the sensor 125 via the wired connection 220.

Because the pairing tool 205 generates the pairing bundles and causes the pairing bundles to be stored on the access control device 110 and the sensor 125, the access control device 110 and the sensor 125 can become wirelessly paired without the access control device 110 and the sensor 125 ever performing a wireless pairing process or entering a wireless pairing mode. By avoiding entering a wireless pairing mode, various improvements can be realized. For example, when operating in a wireless pairing mode, a third party system may be able to access the device. Furthermore, the wired connections 210 and 220 can be reliable methods of communicating the pairing data bundles to the access control device 110 and the sensor 125. This reliable communication may be less error prone than the wireless pairing process which may rely on wireless communication. Issues with signal strength or signal penetration can cause errors in pairing the access control device 110 with the sensor 125 which are avoided by the pairing tool 205 generating and transmitting the pairing data bundles via the wired connections 210 and 220.

As an example, a sensor might have five sensor and three access control devices. The pairing tool 205 can store addresses of all five sensors on each of the three access control devices. Furthermore, the pairing tool 205 can store the addresses of all three access control devices on each of the five sensors. The encryption key of each of the five sensors can be stored on each respective sensor of the five sensors (e.g., the sensors can store their own encryption keys but not the keys of the other sensors). Furthermore, all five encryption keys can be stored on each of the three access control devices. Furthermore, the encryption key of each access control device can be stored on each respective access control device of the three access control devices (e.g., the access control devices can store their own keys but not the keys of other access control devices). All three encryption keys of the access control devices can be stored on each of the five sensors. Based on this distribution of keys, any access control device can communicate with any sensor.

The sensor 125 and the access control device 110 can wirelessly communicate via a communicate protocol. The sensor 125 and the access control device 110 can wirelessly communicate responsive to the access control device 110 and the sensor 125 being paired. The sensor 125 and the access control device 110 can perform a power cycle after storing the first pairing data bundle 240 and the second pairing data bundle 235 respectively. For example, the sensor 125 and the access control device 110 can wirelessly communicate responsive to the access control device 110 storing the first pairing data bundle 235 and the sensor 125 storing the second pairing data bundle 240. The pairing tool 205 can test the wireless communication between the access control device 110 and the sensor 125. The pairing tool 205 can test the wireless communication to determine whether the pairing between the access control device 110 and the sensor 125 is successful or encountered an error.

The pairing tool 205 can receive a confirmation message from the access control device 110 responsive to the access control device 110 storing the first pairing data bundle 235. For example, the access control device 110 can receive the first pairing data bundle 235 from the pairing tool 205, store the first pairing data bundle 235, and generate a confirmation message. The confirmation message can indicate whether the access control device 110 successfully stored the first pairing data bundle 235. The access control device 110 can transmit the confirmation message to the pairing tool 205. The access control device 110 can transmit the confirmation message to the pairing tool 205 via the wired connection 210. Based on the confirmation message, the pairing tool 205 can determine that the step of storing the first pairing data bundle 235 on the access control device 110 was successful. The pairing tool 205 can receive a confirmation message from the sensor 125 responsive to the sensor 125 storing the second pairing data bundle 240. For example, the sensor 125 can receive the second pairing data bundle 240 from the pairing tool 205, store the second pairing data bundle 240, and generate a confirmation message. The confirmation message can indicate whether the sensor 125 successfully stored the second pairing data bundle 240. The sensor 125 can transmit the confirmation message to the pairing tool 205. The sensor 125 can transmit the confirmation message to the pairing tool 205 via the wired connection 220. Based on the confirmation message, the pairing tool 205 can determine that the step of storing the second pairing data bundle 240 on the sensor 125 was successful.

The pairing tool 205 can test the wireless pairing between the access control device 110 and the sensor 125 by causing the access control device 110 to wirelessly transmit a command to the sensor 125. For example, the pairing tool 205 can communicate an instruction to the access control device 110 to wirelessly send a command to operate a component of the vehicle 105, e.g., lock or unlock a door, open or close a trunk, turn on or off the vehicle 105 to the sensor 125. The pairing tool 205 can transmit the instruction to the access control device 110 via the wired connection 210. Responsive to receiving the instruction, the access control device 110 can wirelessly communicate the command to the sensor 125. The access control device 110 can transmit the command via the first pairing data. For example, the access control device 110 can encrypt the command with an encryption key of the access control device 110. The access control device 110 can wirelessly transmit the command with a destination address, e.g., the address of the sensor 125. The sensor 125 can wirelessly receive the command. The sensor 125 can receive and interpret the command via the second pairing data bundle 240. For example, the sensor 125 can identify the destination address included in the message as being the address of the sensor 125 and identify that the sensor 125 is the intended recipient of the message. The sensor 125 can decrypt the command based on an encryption key of the access control device 110.

Responsive to receiving the command, the sensor 125 can communicate the command to one or more systems of the vehicle 105. The systems can implement the command, e.g., unlock a door, lock a door, turn the vehicle on, turn the vehicle off. The pairing tool 205 can receive a status indicator from the vehicle 105. The status indicator can indicate whether the command was performed. For example, the pairing tool 205 can query a particular data point or data register of a system of the vehicle 105 and receive a value. The pairing tool 205 can determine whether the value indicates that the command was performed. The pairing tool 205 can generate a report indicating that the pairing between the access control device 110 and the sensor 125 was successful based on the value indicating that the command was performed. The pairing tool 205 can generate a report indicating that the pairing between the access control device 110 and the sensor 125 was not successful based on the value indicating that the command was not performed. The pairing tool 205 can generate a detailed report by running multiple tests for multiple access control devices and multiple sensors 125. The report can indicate whether each access control device and each sensor were paired successfully or encountered an error. Responsive to detecting that the access control device 110 and the sensor 125 were not properly paired, the pairing tool 205 can perform the operations 225 and 230 again to attempt to pair the access control device 110 and the sensor 125. The pairing tool 205 can run the test again to determine whether the access control device 110 and the sensor 125 were paired successfully.

Figure 3:
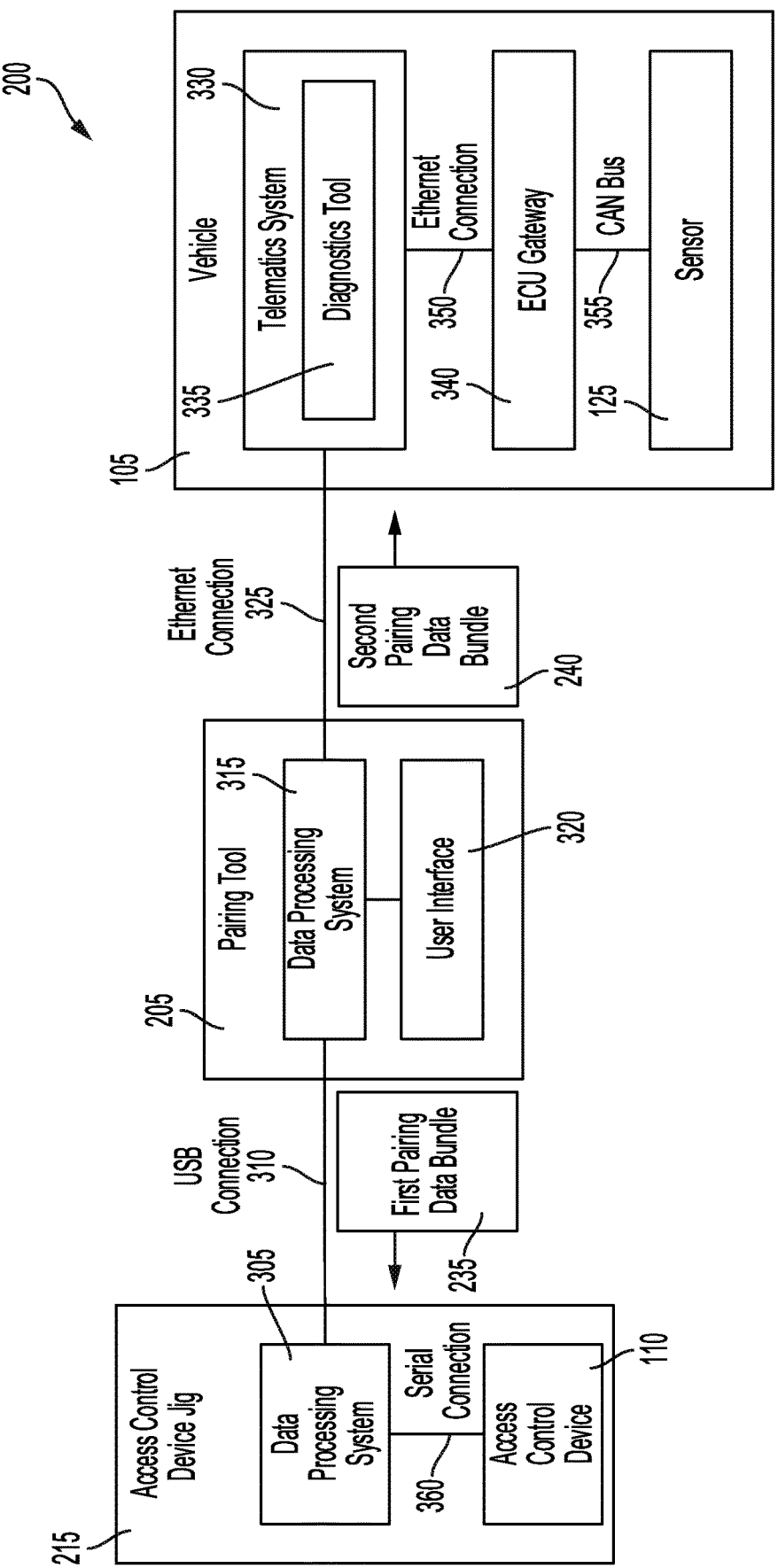
FIG. 3 depicts a block diagram of an example system including the pairing tool pairing the access control device with the sensor of the electric vehicle.

FIG. 3 depicts a block diagram of the system 200 including the pairing tool 205 pairing the access control device 110 with the sensor 125 of the vehicle 105. The pairing tool 205 includes a data processing system 315 and a user interface 320. The pairing tool 205 and the user interface 320 are described in greater detail in FIG. 13. The data processing system can include one or more processors coupled to memory. The data processing system 315 can perform the operations 225 and 230 described in FIG. 2. The data processing system 315 can generate the first pairing data bundle 235 and the second pairing data bundle 240. The data processing system 315 can be coupled to the user interface 320. The user interface 320 can include an input device to receive user input from a user and a display to display output to the user. The data processing system 315 can receive a command from the user interface 320 based on a user input to the user interface 320. Responsive to receiving the command, the data processing system 315 can perform the operations 225 and 230. For example, responsive to the command, the data processing system 315 can generate the first pairing data bundle 235 and transmit the first pairing data bundle 235 to the access control device 110 and generate the second pairing data bundle 240 and transmit the second pairing data bundle 240 to the sensor 125. The data processing system 315 can perform a test to verify that the access control device 110 and the sensor 125 were successfully paired. The data processing system 315 can display the report on the user interface 320.

The pairing tool 205 can be connected to the access control device jig 215 via a USB connection 310. The USB connection 310 can be an example of the wired connection 210 described in FIG. 2. The data processing system 315 can include one or more circuits that implement a USB host. The access control device jig 215 can include a data processing system 305 that implements a USB endpoint and communicate with the data processing system 315 over the USB connection 310. The data processing system 305 can be the same as or similar to the data processing system described at FIG. 13. The USB connection 310 can be made with one or more USB cables. The data processing system 305 can implement a serial connection 360 with the access control device 110. The serial connection 360 can be universal asynchronous receiver-transmitter (UART), universal synchronous and asynchronous receiver-transmitter (USART), inter-integrated circuit (I2C), or serial peripheral interface (SPI). The data processing system 305 can make one or more electrical connections with the access control device 110 and implement the serial connection 360 over the serial connection 360.

The data processing system 315 can receive an address of the address control device 110 via the USB connection 310 and the serial connection 360. For example, the data processing system 305 can send a command to read registers or memory storage elements of the access control device 110 that store the address. The circuits can communicate the address to the data processing system 315 via the USB connection 310. The data processing system 305 can read the address of the access control device 110 responsive to receiving a request for the address from the data processing system 315. Furthermore, the data processing system 315 can cause the access control device 110 to store the first pairing data bundle 235 via the USB connection 310 and the serial connection 360. For example, the data processing system 315 can transmit the first pairing data bundle 235 to the data processing system 305 via the USB connection 310. The data processing system 305 can write the first pairing data bundle 235 to one or more registers or storage elements of the access control device 110 via the serial connection 360.

The data processing system 315 can communicate with a telematics system 330 of the vehicle 105. The data processing system 315 can communicate with the telematics system 330 via an Ethernet connection 325. The Ethernet connection 325 can be an example of the wired connection 220 described at FIG. 2. The Ethernet connection 325 can implement OBD or OBD2 communication. The data processing system 315 and the vehicle 105 can include Ethernet controllers, Physical Layers (PHYs), or Ethernet transceivers to implement communication over the Ethernet connection 325. The Ethernet connection 325 can include one or multiple Ethernet cables. The data processing system 315 can transmit the second pairing data bundle 240 to the sensor 125 via the Ethernet connection 325. The data processing system 315 can transmit the second pairing data bundle 240 to the telematics system 330 via the Ethernet connection 325.

Figure 13:
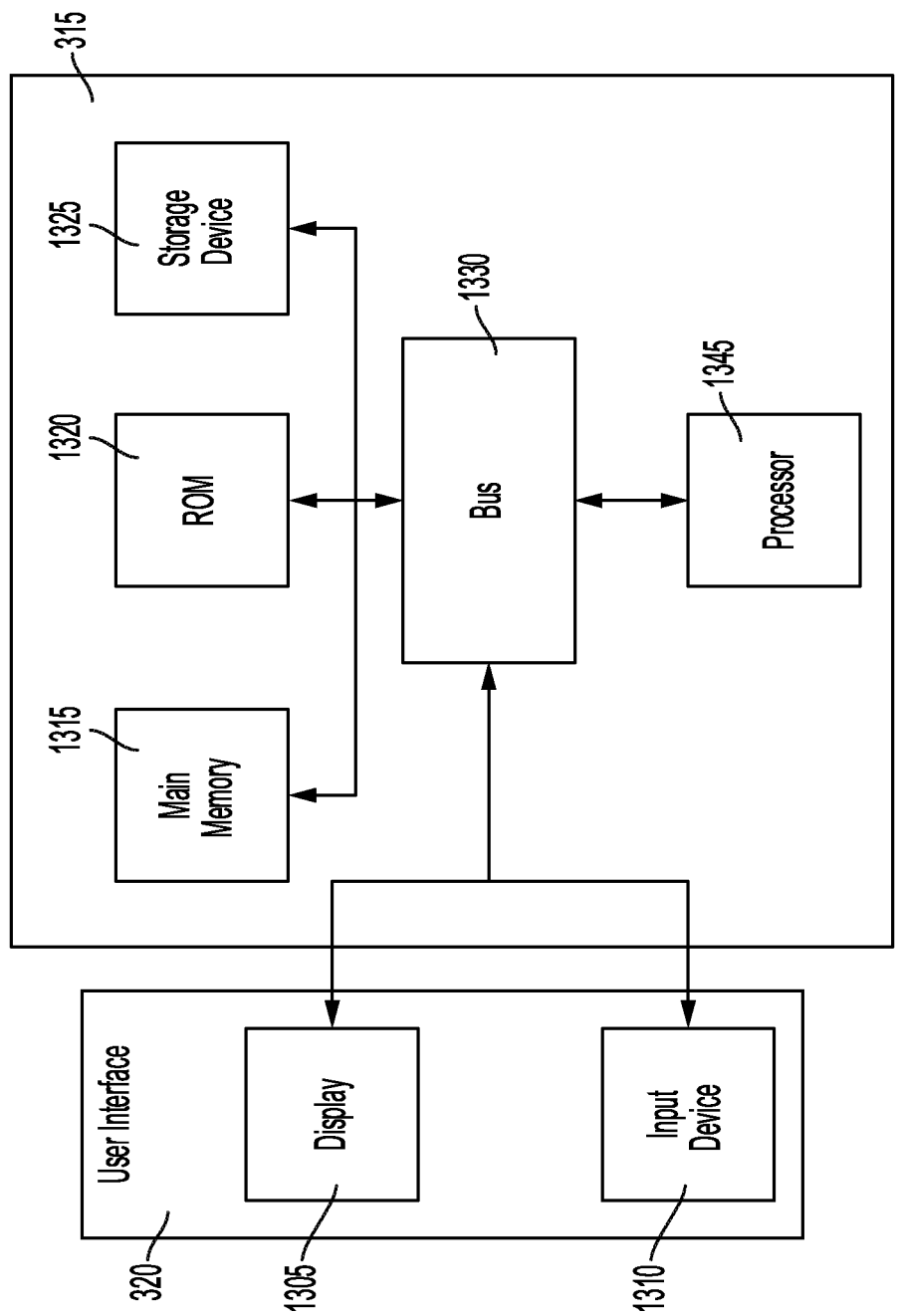
FIG. 13 is a block diagram illustrating an architecture for a computer system that can be employed to implement elements of the systems and methods described and illustrated herein.

The telematics system 330 can be a data processing system such as the example data processing system described at FIG. 13. The telematics system 330 can implement vehicle features such as automatic collision notification, emergency assistance, or vehicle diagnostics. The telematics system 330 can include a diagnostics tool 335. The diagnostics tool 335 can collect data of the vehicle 105, e.g., record historical driving data, record battery charge data, record battery temperature data, store component error data, determine component health data. The diagnostics tool 335 can communicate with various components of the vehicle 105. For example, the diagnostics tool 335 can communicate with multiple ECUs of the vehicle 105. The diagnostics tool 335 can connect with the ECUs via an ECU gateway 340. The diagnostics tool 335 can connect with the ECU gateway 340 via an Ethernet connection 350. The ECU gateway 340 can include one or more components that implement communication over the Ethernet connection with the telematics system 330 and one or more components that implement communication over a controller area network (CAN) bus 355 that the ECUs communicate over. For example, the gateway 340 can communicate with the sensor 125 over the CAN bus 355. The sensor 125 can include one or more components that perform CAN communication with the diagnostics tool 335 via the CAN bus 355 and the ECU gateway 340.

The diagnostics tool 335 can read an address of the sensor 125 via the ECU gateway 340. The diagnostic tool 335 can read one or more registers or data storage elements of the sensor 125 to retrieve the address. The diagnostics tool 335 can transmit the address to the data processing system 3125 via the Ethernet connection 325. The data processing system 315 can transmit a request for the address of the sensor 125 (or a general request for all addresses of all sensors 125 that can be paired with the access control device 110). The diagnostics tool 335 can read the address of the sensor 125 responsive to the request. The diagnostics tool 335 can transmit the address to the data processing system 315 responsive to reading the address.

The data processing system 315 can cause the sensor 125 to store the second pairing data bundle 240. The data processing system 315 can transmit the second pairing data bundle 240 to the telematics system 330 via the Ethernet connection 325. The telematics system 330 (e.g., the diagnostics tool 335) can transmit the second pairing data bundle 240 to the sensor 125 via the ECU gateway 340 which can be connected to the telematics system 330 via the Ethernet connection 350 and connected to the sensor 125 via the CAN bus 355. The telematics system 330 can write the second pairing data bundle 240 to the sensor 125 by causing one or more registers or data storage elements of the sensor 125 to store the second pairing data bundle 240.

Figure 4:
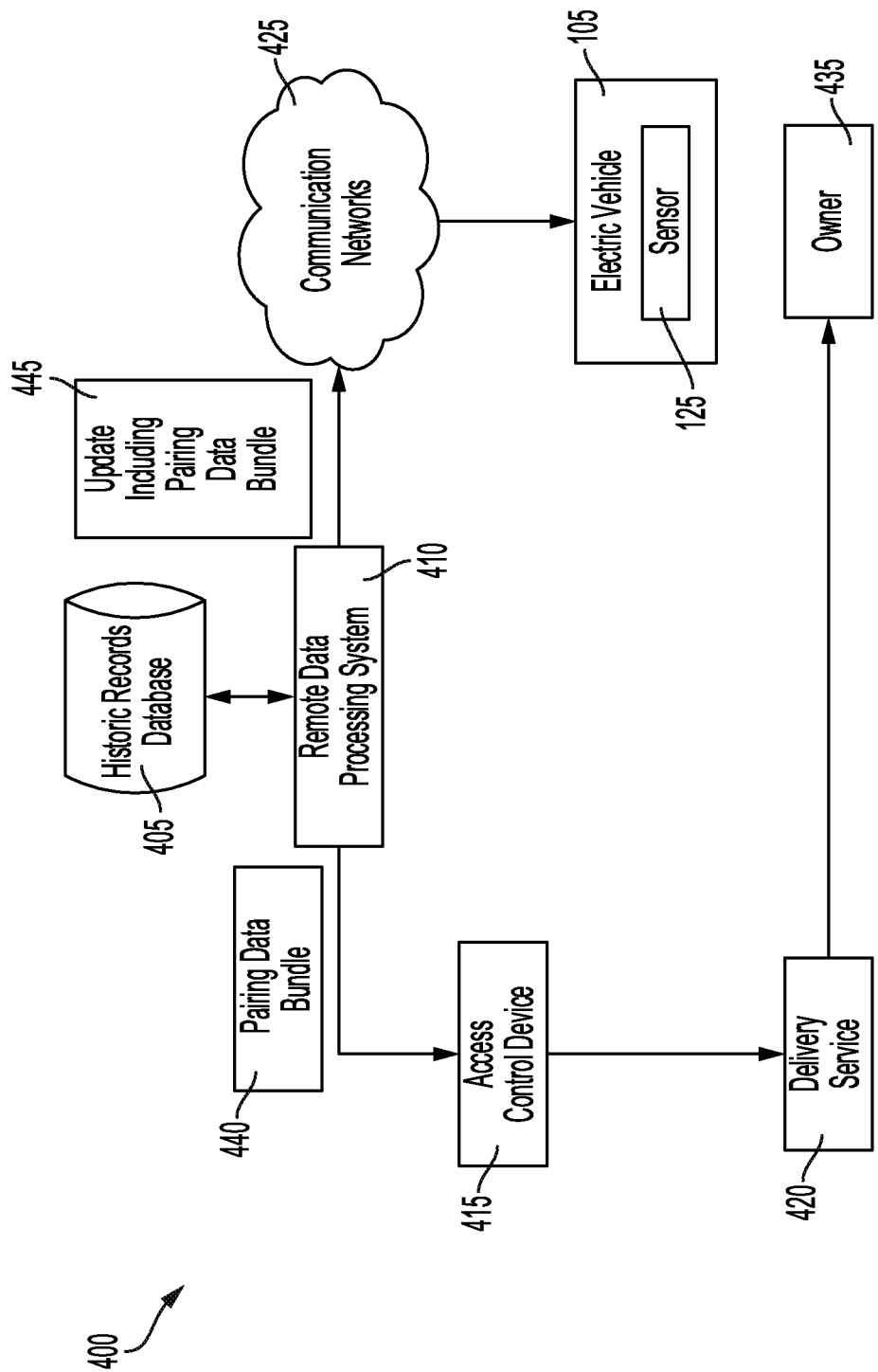
FIG. 4 depicts a block diagram of an example system that pairs an access control device with the sensor of the electric vehicle via an update for the electric vehicle.

FIG. 4 depicts a block diagram of a system 400 that pairs an access control device 415 with the sensor 125 of the vehicle 105 via an update 445 for the vehicle 105. The system 400 includes a remote data processing system 410. The remote data processing system 410 can be include one or multiple processors coupled to memory. The remote data processing system 410 can be similar to the example data processing system described at FIG. 13. The remote data processing system 410 can be a cloud computing system connected to the vehicle 105 through the Internet. The remote data processing system 410 can be a server system located remote from the vehicle 105.

The remote data processing system 410 can be coupled to a historic records database 405. The historic records database 405 can store a record of encryption keys or addresses of the vehicle 105. The historic records database 405 can store pairing data bundles used to pair an access control device and a sensor during a manufacturing or provisioning phase of the vehicle 105). For example, the pairing tool 205 can store a record of the addresses of the sensors 125 of the vehicle 105 and the encryption keys of the sensors 125 of the vehicle 105 stored to the sensors 125 during a manufacturing or provisioning phase of the vehicle 105 (e.g., before the vehicle 105 is deployed to a customer). The pairing tool 205 can store the addresses and encryption keys in the database 405. The paring tool 205 can store the addresses and the encryption keys and catalog the addresses and encryption keys under an identifier of the vehicle 105.

The remote data processing system 410 can receive an instruction to pair the access control device 415 with the vehicle 105. The instruction can be generated via a computing system of a user. For example, the user may be the owner 435 of the vehicle 105. The owner 435 may be in possession of the vehicle 105, e.g., the vehicle 105 has been sold and transferred to the owner 435. The owner 435 may order a new access control device, e.g., the access control device 415. The user may order the new access control device 415 to replace a lost or broken access control device. The user may order the new access control device 415 in order to have an additional access control device for the vehicle 105. For example, if there will be a new driver of the vehicle 105, the owner 435 may need to order the new access control device 415 for the new driver of the vehicle 105. For example, a relative of the user, a child of the user, a spouse of the user, can begin driving the vehicle 105 and the owner 435 may wish to order the access control device 415 so the new driver can have their own access control device.

To ensure that only an authorized individual can order the access control device 415, the remote data processing system 410 can implement one or more security features. The security features can include requiring the owner 435 to enter a password to order the access control device 415. The security features can include performing a two-factor authentication with an email or phone number of the owner 435. The security features can include requiring the owner 435 to answer one or multiple challenge questions, e.g., asking the user what previous addresses the owner 435 lived at, asking the owner 435 for a maiden name, asking the owner 435 for a name of a relative, asking the owner 435 to confirm one or multiple digits of a government identification number (e.g., a social security number).

The order could indicate an identifier of the vehicle 105. The remote data processing system 410 can receive the identifier. The remote data processing system 410 can retrieve the historic data of the vehicle 105 from the historic records database 405. For example, the remote data processing system 410 can query the historic records database 405 with the identifier of the vehicle 105. The remote data processing system 410 can receive the encryption key of the sensor 125 from the historic records database 405. The remote data processing system 410 can receive an address of the sensor 125 from the historic records database 405. Although one sensor 125 is shown in FIG. 4, the vehicle 105 can include multiple sensors 125, e.g., as shown in the example of FIG. 6, and the pairing described in FIG. 4 can be performed for multiple sensors 125.

The remote data processing system 410 can generate a pairing data bundle 440 for the access control device 415. The remote data processing system 410 can generate a pairing data bundle for the vehicle 105. The remote data processing system 410 can generate an update 445 for the vehicle 105. The update 445 can include the pairing data bundle generated for the vehicle 105. The remote data processing system 410 can generate the pairing data bundle 440 to include the address of the sensor 125. The remote data processing system 410 can generate the pairing data bundle 440 to include the address of the sensor 125 received from the historic records database 405. The remote data processing system 410 can generate the pairing data bundle 440 to include the encryption key of the sensor 125. The remote data processing system 410 can generate the pairing data bundle 440 to include the encryption key of the sensor 125 received from the historic records database 405.

The remote data processing system 410 can receive an address from the access control device 415. The remote data processing system 410 can connect with the access control device 415 via a wired or wireless connection (e.g., the wired connection 210). For example, the remote data processing system 410 can read data from or write data to the access control device 415 via a jig that makes connections with the access control device 415 (e.g., the access control device jig 215). For example, the remote data processing system 410 can generate the pairing data bundle of the update 445 to include the address received from the access control device 415.

The remote data processing system 410 can generate an encryption key for the access control device 415. The remote data processing system 410 can perform a pseudo-random encryption key generation. The remote data processing system 410 can be pre-loaded with encryption keys (e.g., previously identified prime numbers). The remote data processing system 410 can implement a pseudo-random number generator to generate the encryption keys. The remote data processing system 410 can perform a Key Derivation Function (KDF) to generate the encryption keys from a secret value or from secret values. The KDF can generate the encryption key through a cryptographic hash function or a block cipher. The remote data processing system 410 can generate the pairing data bundle 440 to include the encryption key of the access control device 415. The remote data processing system 410 can generate the pairing data bundle of the update 445 to include the encryption key of the access control device 415.

The remote data processing system 410 transmits the pairing data bundle 440 to the access control device 415. The remote data processing system 410 can transmit the pairing data bundle 440 to the access control device 415 via a wireless or wired connection to the access control device 415. For example, the remote data processing system 410 can communicate with the access control device 110 via the wired connection 210 and the access control device jig 215. The remote data processing system 410 can transmit the update 445 to the vehicle 105. The remote data processing system 410 can transmit the update 445 to the vehicle 105 to locally store the second pairing data bundle on the vehicle 105 to pair the sensor 125 with the access control device 415. The vehicle 105 can locally store the pairing data bundle of the update 445 on the sensor 125. The remote data processing system 410 can transmit the update 445 to the vehicle 105 via communication networks 425. The communication networks 425 can include a local area network (LAN), a wide area network (WAN), or a metropolitan area network (MAN). The communication networks 425 can include various cellular networks such as 3G, 4G Long Term Evolution (LTE), 5G, or 6G communication networks. The communication networks 425 can include a Wi-Fi network. The communication networks 425 can include the Internet or private networks.

The update 445 can be an over the air (OTA) update. The OTA update can distribute software, configuration settings, addresses, keys, or other information wirelessly to the vehicle 105. Furthermore, the OTA update can be delivered via wired communication, e.g., via a communication connection made when the vehicle 105 is plugged in and charging. The OTA update can be delivered to the vehicle 105 when the vehicle 105 is deployed. For example, the vehicle 105 can receive the OTA update while the vehicle 105 is parked in a driveway or garage of the owner 435, while used in commerce (e.g., while used to deliver packages or goods or used by a service person to provide services), parked in a parking garage, or parked in a parking lot.

As an example, the access control device 415 can replace an old access control device of the vehicle 105. The old access control device can be lost by the owner 435 or an operator of the vehicle 105. The old access control device can be broken. The old access control device could be paired with the sensor 125 during a manufacturing or provisioning process of the electric vehicle 105. The remote data processing system 410 can pair a new access control device, e.g., the access control device 415 and un-pair the old access control device. The remote data processing system 410 can generate a new encryption key for the new access control device 415. The remote data processing system 410 can cause the pairing data bundle of the update 445 to include the new encryption key of the new access control device 415 and an address of the new access control device 415. Furthermore, the update 445 can include a command to un-pair the old access control device. The old access control device can be identified in the update 445 based on an identifier or address of the existing access control device. The remote data processing system 410 can look up the identifier or address of the existing access control device via the historic records database 405 which may store a record of the identifier or address of the old access control device. A computing system of the owner 435 can provide identifying information (e.g., a access control device identifier of the lost or broken access control device or identifiers of other access control devices that the user has that the remote data processing system 410 can use to infer the identifier of the lost or broken access control device) that the remote data processing system 410 can use to lookup the identifier or address of the records database 405 based on the identifying information.

The update 445 electric can install or implement the update 445. Installing or implementing the update 445 can cause a pairing data bundle of the existing access control device to be deleted. Installing or implementing the update 445 can cause the pairing data bundle of the existing access control device to be replaced with the pairing data bundle of the update 445. The update 445 can delete an encryption key or an address of the old access control device. The update 445 can replace the encryption key or the address of the old access control device with the new encryption key of the access control device 415 included in the update 445 and a new address of the access control device 415 included in the update 445. By adding the new pairing data bundle for the access control device 415 and deleting or replacing the old data paring bundle of the old access control device, the access control device 4154 can become paired with the sensor 125 while the old access control device can become un-paired.

As another example, the access control device 415 can be an additional access control device 415. The access control device 415 can be paired with the sensor 125 while an existing access control devices can remain paired with the access control device 415. The vehicle 105, for example, may store another pairing data bundle of an existing address control device. The update 445 can cause the vehicle 105 (e.g., the sensor 125) to store the pairing data bundle of the update 445 and retain the pairing data bundle of the existing access control device. The existing access control device can be paired with the sensor 125 during a manufacturing or provisioning process and the sensor 125 can store an address and an encryption key of the existing access control device. The update 445 can cause the sensor 125 to locally store the pairing data bundle of the update 445 while retaining the pairing data bundle of the existing access control device. The update 445 can cause the sensor 125 to store a new encryption key of the access control device 415 and a new address of the access control device 415 while retaining storage of an encryption key of the existing access control device and an address of the existing access control device.

A delivery service 420 can deliver the access control device 415 to the owner 435. The delivery service 420 can deliver the access control device 415 to a home or business of the owner 435. The delivery service 420 can request that the owner 435 to present a government identification (ID), a passport, an order receipt, or answer security questions before the delivery service 420 transfers the access control device 415 to the owner 435. The delivery service 420 can deliver the access control device 415 to a service site. The service site can hold the access control device 415 until the owner 435 comes to the service site to pick up the access control device 415. The service site may require the owner 435 present a government ID, a passport, an order receipt, or answer security questions before the service site transfers the access control device 415 to the owner 435.

Figure 5:
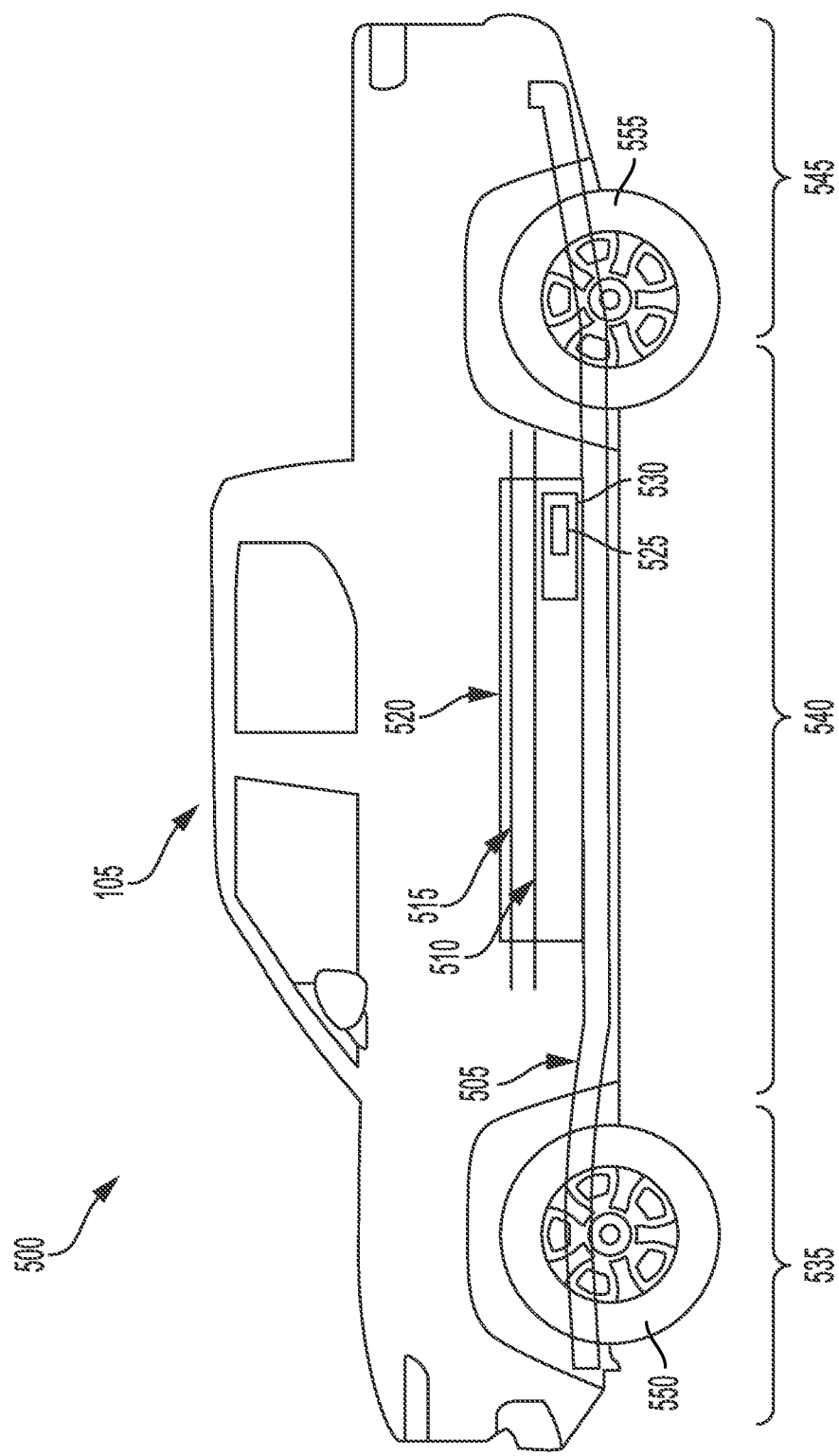
FIG. 5 depicts an example electric vehicle.

FIG. 5 depicts is an example cross-sectional view 500 of an vehicle 105 installed with at least one battery pack 520. The electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 520 can also be used as an energy storage system to power a building, such as a residential home or commercial building. The vehicle 105 can be fully electric or partially electric (e.g., plug-in hybrid) and further, the vehicle 105 can be fully autonomous, partially autonomous, or unmanned. The vehicle 105 can also be human operated or non-autonomous. The vehicle 105 such as electric trucks or automobiles can include on-board battery packs 520, battery modules 530, or battery cells 525 to power the electric vehicles. The vehicle 105 can include a chassis 505 (e.g., a frame, internal frame, or support structure). The chassis 505 can support various components of the vehicle 105. The chassis 505 can span a front portion 535 (e.g., a hood or bonnet portion), a body portion 540, and a rear portion 545 (e.g., a trunk, payload, or boot portion) of the vehicle 105. The battery pack 520 can be installed or placed within the vehicle 105. For example, the battery pack 520 can be installed on the chassis 505 of the vehicle 105 within one or more of the front portion 535, the body portion 540, or the rear portion 545. The battery pack 520 can include or connect with at least one busbar, e.g., a current collector element. For example, the first busbar 515 and the second busbar 510 can include electrically conductive material to connect or otherwise electrically couple the battery modules 530 or the battery cells 525 with other electrical components of the vehicle 105 to provide electrical power to various systems or components of the vehicle 105.

The vehicle 105 includes two front wheels 550 and two rear wheels 555. The vehicle 105 can include one or multiple motors. The motors can drive an axel connected to the two front wheels 550 or an axel connected to the two rear wheels 55. A single motor may drive an axel of the two front wheels 550. A single motor may drive an axel of the two rear wheels 555. Each wheel of the wheels 550 and 555 can be driven by an individual motor. For example, each of the four wheels 550 and 555 can be driven by one of four motors. The battery pack 520 can discharge stored energy to power the motors of the front wheels 550 and the rear wheels 555. The battery pack 520 can discharge stored energy to generate power that the motors receive. Operating the motors of the wheels 550 and 555 can cause the vehicle 105 to drive forward, reverse, or turn.

FIG. 6 depicts an example cross-sectional view 600 of the vehicle 105 including multiple sensors 125 that communicate with the access control device 110. The vehicle 105 includes the sensors 125 described in FIGS. 1-5. The pairing tool 205 as described at FIGS. 1-3 can pair the access control device 110 with each of the sensors 125.

The vehicle 105 can include a sensor 125 in a front bumper of the vehicle 105. The vehicle 105 can include a sensor 125 in a rear bumper of the vehicle 105. The vehicle 105 can include a sensor 125 in a front driver-side door 635 of the vehicle 105. The vehicle 105 can include a sensor 125 in a rear driver-side door 610 of the vehicle 105. Although not shown in the cross-sectional view 600, the vehicle 105 can include a sensor 125 in a front passenger-side door of the vehicle 105, a sensor 125 in a rear passenger-side door of the electric vehicle 105, a sensor 125 under a front hood of the electric vehicle 105, a sensor 125 in the truck bed or tailgate of the electric vehicle 105, or a sensor 125 in a center console of the electric vehicle 105.

The front driver-side door 635 includes a handle 605. The handle 605 can operate a latch mechanism to latch or unlatch the front driver-side door 635. The latch mechanism can be locked or unlocked by a locking mechanism. The locking mechanism can prevent the latching mechanism from unlatching allowing the front driver-side door 635 to open. The sensor 125 located in the front driver-side door 635 can be electrically connected with the locking mechanism (e.g., through a data processing system of the electric vehicle 105). This sensor 125 can transmit a command to the locking mechanism to lock or unlock the locking mechanism. Similarly, any other of the sensors 125 of the electric vehicle 105 can send a command to the locking mechanism of the front driver-side door to lock or unlock. The sensor 125 of the front driver-side door 635 can receive a message from the access control device 110 to lock or unlock the electric vehicle 105. The message can be a message to unlock all doors of the electric vehicle 105 or the front driver-side door 635 specifically. The message can be transmitted by the access control device 110 based on a wireless pairing between the access control device 110 and the sensor 125, e.g., based on a pairing data bundle stored by the access control device 110 and a pairing data bundle stored by the sensor 620. The access control device 110 can send the message to the sensor 125 of the front driver-side door 635 responsive to a user interacting with a button of the access control device 110. Furthermore, the access control device 110 can send the message to the sensor 125 of the front driver-side door 635 automatically responsive to being within a predefined distance from the sensor 125 of the front driver-side door 635.

The rear driver-side door 610 includes a handle 615. The handle 615 can operate a latch mechanism to open the rear driver-side door 610. The latch mechanism can be locked or unlocked by a locking mechanism. The locking mechanism can prevent the latching mechanism from unlatching and allowing the rear driver-side door 610 from opening. The sensor 125 of the rear driver-side door 610 can be electrically connected with the locking mechanism. This sensor 125 can transmit a command to the locking mechanism to lock or unlock the locking mechanism. Similarly, the any other of the sensors 125 can send a command to the locking mechanism of the rear driver-side door 610 to lock or unlock. The sensor 125 of the rear driver-side door 610 can receive a message from the access control device 110 to lock or unlock the electric vehicle 105. The message can be a message to unlock all doors of the electric vehicle 105 or the front driver-side door 635 specifically. The message can be transmitted by the access control device 110 based on a wireless pairing between the access control device 110 and the sensor 125 of the rear driver-side door 610, e.g., based on a pairing data bundle stored by the access control device 110 and a pairing data bundle stored by the sensor 125 of the rear driver-side door 610.

The electric vehicle 105 can include a sensor 125 within a cabin of the electric vehicle 105, e.g., in a center console of the electric vehicle 105. This sensor 125 can detect a presence of the access control device 110 within the electric vehicle 105. The sensor 125 of the cabin can determine that the access control device 110 is authorized to turn the vehicle on or off. The sensor 125 of the cabin can wirelessly communicate with the access control device 110 based on a pairing data bundle stored on the sensor 125 of the cabin and a pairing data bundle stored on the access control device 110 that wirelessly pairs the access control device 110 with the sensor 125 of the cabin. When a user is carrying the access control device 110 and is within the electric vehicle 105, the access control device 110 can communicate with the sensor 125 of the cabin and a data processing system of the electric vehicle 105 can allow a user to turn on or turn off the electric vehicle 105 by pressing a button on the electric vehicle. The electric vehicle can determine that the access control device 110 is within the vehicle based on a signal strength measured between the access control device 110 and the sensor 125 of the cabin meeting a threshold (e.g., the signal strength is greater than a predefined signal strength)

Figure 7:
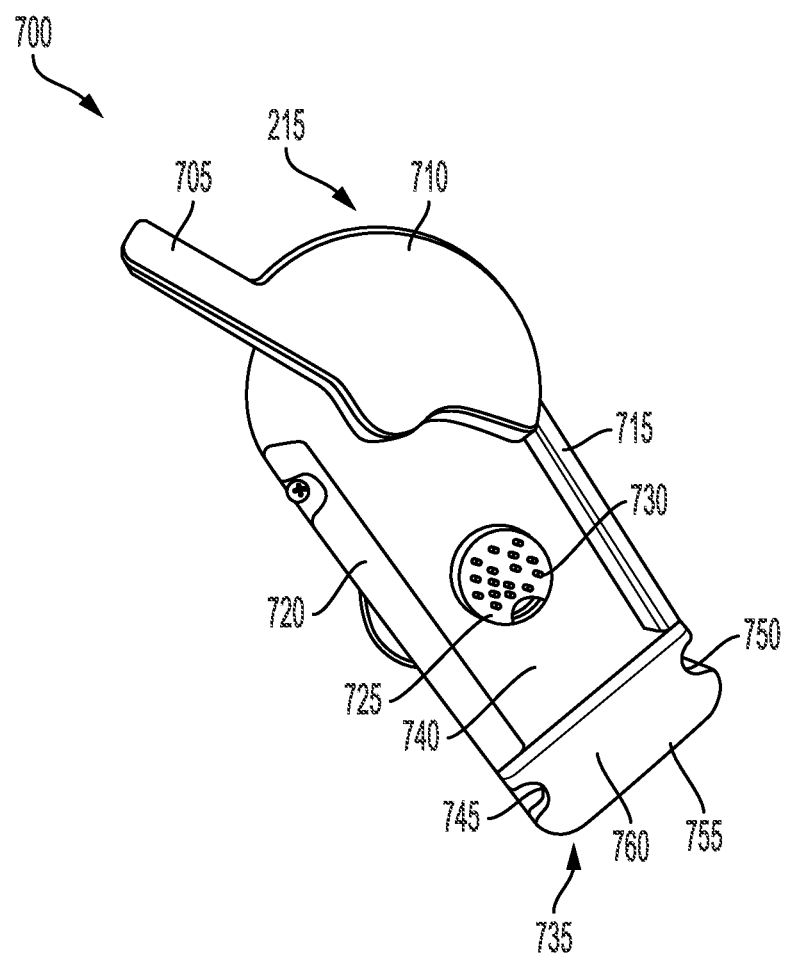
FIG. 7 depicts a top-view of an example access control device jig.

FIG. 7 depicts a top-view 700 of an example of the access control device jig 215. The jig 215 includes mechanical components structured to hold the access control device 110 in a cavity of the jig 215. For example, the jig 215 includes a back plate 740 that the access control device 110 rests upon. Side walls 715 and 720 extend up vertically from the back plate 740 and perpendicularly to the back plate 740. Furthermore, front wall 735 may extend vertically from the back plate 740 perpendicular to the back plate 740. The side walls 715 and 720 and the front wall 735 can form an enclosure (e.g., a cavity) that the access control device 110 can rest within.

The front wall 735 may be a hollow and include portions that forms an enclosure. For example, the front wall 735 may have a top portion 760, two side portions 745 and 750, and a bottom portion 755. The front wall 735 may have no front portion such that a portion of the access control device 110 can extend into the enclosure formed by the front wall 735 and hold the access control device 110 in the jig 215 (e.g., as shown in FIG. 8).

The jig 215 includes a rotating member 710. The rotating member 710 can extend vertically from the back plate 740 and perpendicularly to the back plate 740. A portion of the rotating member 710 can be in contact with the back plate 740. This portion can be a rotational component such as a pin-in-socket, a bearing, or a ball-in-sock. Another portion of the rotating member 710 can be held above the side walls 720 and 715 such that the rotating member 710 can rotate on the back plate 740 to move from a first position (shown in FIG. 7) to a second position (shown in FIG. 8). The rotating member 710 includes a control portion 705. The control portion 705 can be an elongated portion of the rotating member 710 that provides a lever to turn the rotating member 710 from the first position to the second position. When the access control device 110 is placed in the jig 215, the rotating member 710 can rotate from the first position to the second position where a portion of the rotating member 710 can be above the side walls 720 and 715. This portion can also be above the access control device 110 and can hold the access control device 110 to the back plate 740.

The jig 215 includes a cylindrical portion 725. The cylindrical portion 725 can extend vertically from the back plate 740 and perpendicularly to the back plate 740. The cylindrical portion 725 can extend up from the back plate to meet one or more contacts of the access control device 110 with contacts 730 positioned on the cylindrical portion 725. The contacts 730 can form one or multiple electrical connections with the contacts of the access control device 110. The contacts 730 can include a positive power contact and a negative power contact. These power contacts can provide power to the access control device 110 when the access control device 110 is positioned in the jig 215. The contacts 730 can further include communication contacts. These communication contacts can implement communication with the access control device 110. For example, the serial connection 360 described in FIG. 3 can be made with the access control device 110 via the communication contacts of the contacts 730. The data processing system 315 described in FIG. 3 can transmit the first pairing data bundle 235 to the access control device 110 via an electrical connection made with the access control device 110 by the communication contacts.

Figure 8:
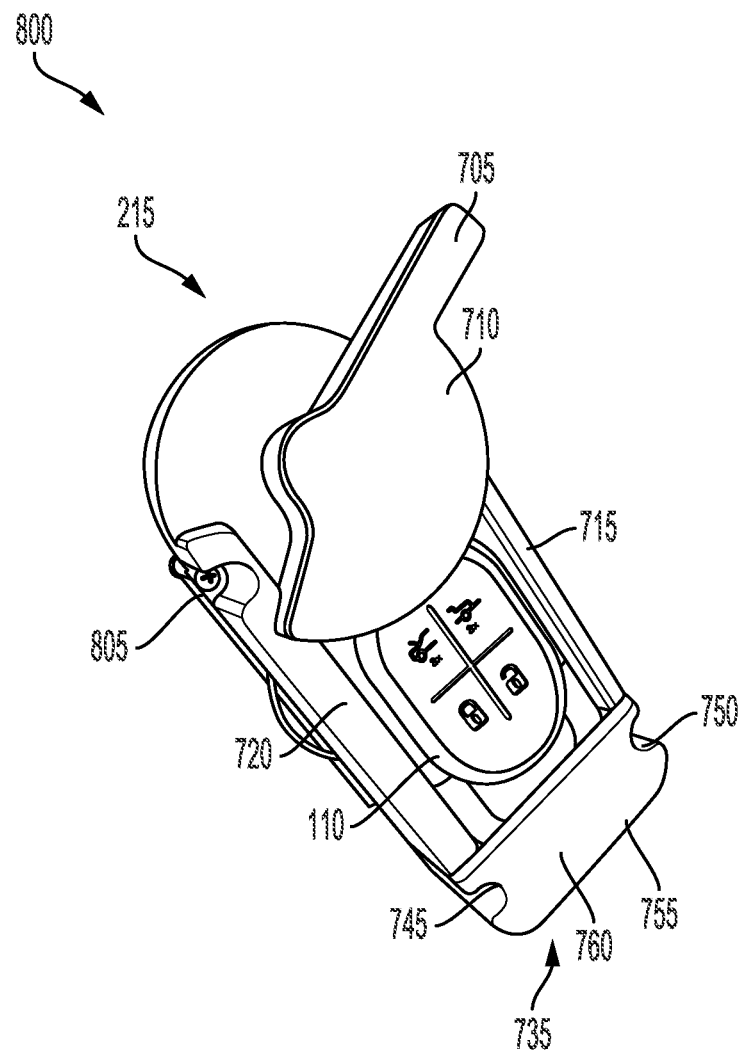
FIG. 8 depicts a top-view of an example access control device jig holding the access control device.

FIG. 8 depicts a top-view 800 of an example of the access control device jig 215 holding the access control device 110. In the top-view 800, the rotating member 710 is rotated to a position over the side walls 720 and 715 to hold the access control device 110 to the back plate 740. By holding the access control device 110 against the back plate 740, electrical connections can be formed by the electrical contacts 730 of the jig 215 and electrical contacts of the access control device (shown in FIG. 10). The electrical contacts 730 can connect with a PCB 805. The printed circuit board (PCB) 805 can be connected to an underside of the back plate 740. The PCB 805 can be connected to the back plate 740 via an adhesive, via one or more fasteners, via a bolt and nut, via a screw. The data processing system 305 described at FIG. 3 can be mounted to the PCB 805.

Figure 9:
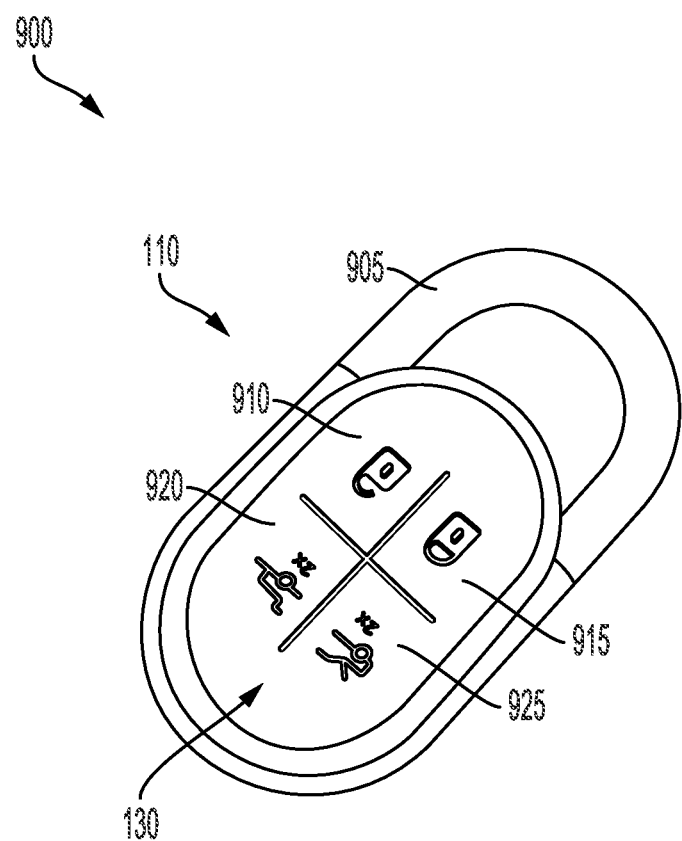
FIG. 9 depicts a top-view of an example access control device.

FIG. 9 depicts a top-view 900 of an example of the access control device 110. The access control device 110 includes a clip 905. The clip 905 can be a curved cylindrical portion that extends from a body of the access control device 110 at a first location and connects to the body the access control device 110 at a second location to form a half loop. Via the clip 905, the access control device 110 can be connected to a key-chain, for example. The user interface 130 of the access control device 110 can include pressure sensitive buttons. The access control device 110 can include an unlock button 910. Responsive to a user interacting with the unlock button 910, the access control device 110 can wirelessly communicate a command to unlock the electric vehicle 105 based on the first pairing data bundle 235 stored by the access control device 110. The access control device 110 can include a lock button 915. Responsive to a user interacting with the lock button 915, the access control device 110 can wirelessly communicate a command to lock the electric vehicle 105 based on the first pairing data bundle 235 stored by the access control device 110.

The access control device 110 can include an open or close front hood button 925. Responsive to a user interacting with the open or close front hood button 925, the access control device 110 can wirelessly communicate a command to open or close a front hood of the electric vehicle 105 based on the first pairing data bundle 235 stored by the access control device 110. The access control device 110 can include an open or close front hood button 925. Responsive to a user interacting with the open or close front hood button 925, the access control device 110 can wirelessly communicate a command to open or close a front hood of the electric vehicle 105 based on the first pairing data bundle 235 stored by the access control device 110. The access control device 110 can include an open or close tailgate button 920. Responsive to a user interacting with the raise or lower tailgate button 920, the access control device 110 can wirelessly communicate a command to raise or lower a tailgate of the electric vehicle 105 based on the first pairing data bundle 235 stored by the access control device 110.

The access control device 110 can include a microphone. A user can speak one or more commands to the access control device 110. The microphone can pick up spoken words and the access control device 110 can identify a command indicated by the spoken words. The access control device 110 can transmit the command to the electric vehicle 105 responsive to sensing the spoken words indicating the command. The access control device 110 can include a data processing system (e.g., an example of a data processing system is shown in FIG. 13). The data processing system can perform natural language processing to identify the command from the spoken words. The data processing system can translate signals sensed by the microphone into text data. The data processing system can identify the command from the text data.

Figure 10:
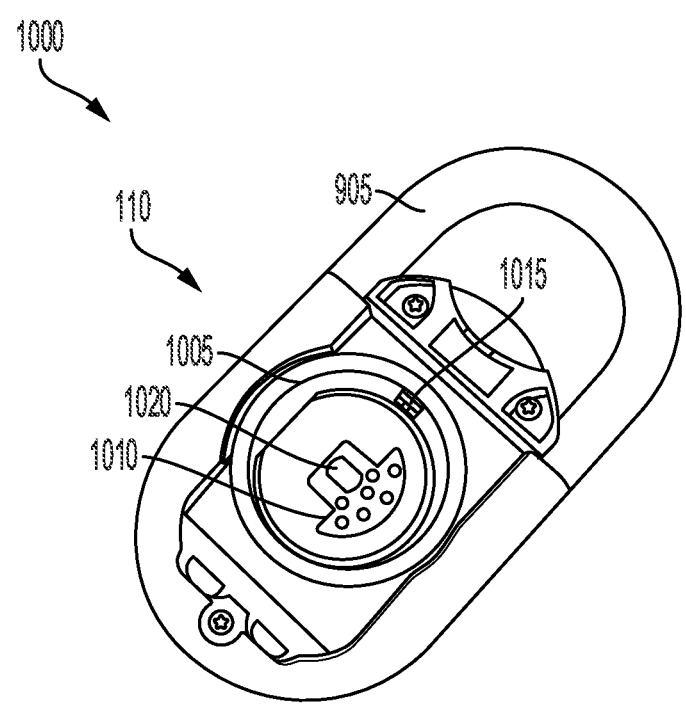
FIG. 10 depicts a bottom-view of an example access control device.

FIG. 10 depicts a bottom-view 1000 of an example of the access control device 110. The bottom-view 1000 shows the access control device 110 where a battery plate can be removed from the access control device 110 and contacts 1010-1020 are exposed within a battery cavity 1005. The contact 1015 can make contact with a positive side of a button battery. The contact 1020 can make contact with a negative side of the button battery. The contacts 730 of the jig 215 can make electrical connections with the contacts 1010 and 1020 when the access control device 110 is placed in the jig 215. The electrical connections can be communication connections that the jig 215 uses to communicate with the access control device 110 (e.g., read an address from the access control device 110 or store the first pairing data bundle 235 on the access control device 110). The electrical connections can provide power to the access control device 110.

Figure 11:
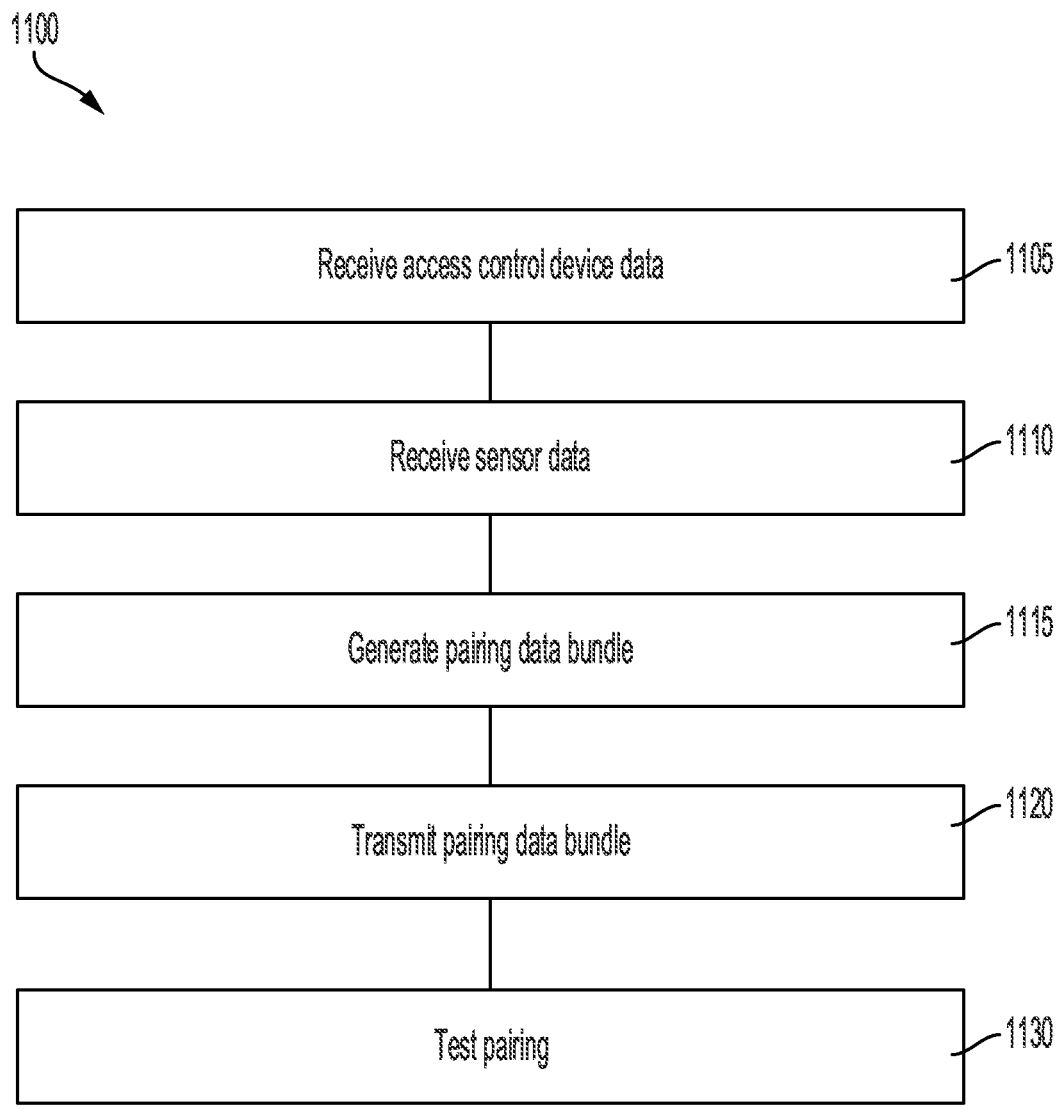
FIG. 11 is a flow diagram illustrating an example method of pairing the access control device with the sensor.

FIG. 11 is a flow diagram illustrating an example method 1100 of pairing the access control device 110 with the sensor 125. The method 1100 can be performed by one or more systems or components depicted in FIGS. 1-10. For example, the data pairing tool 205 can perform the method 1100. The data processing system 315 can perform the method 1100. Furthermore, any computing system or device described herein can perform the method 1100. The method can include any of ACTS 1102-1130. The ACTS 1102-1130 can be performed in various orders and are not limited to the order shown in FIG. 11. ACT 1105 receives access control device data. ACT 1110 receives sensor data. ACT 1115 generates a pairing data bundle. ACT 1120 transmits a pairing data bundle. ACT 1130 tests a pairing.

At ACT 1105, the method 1100 can include a data processing system receiving access control device data. The data processing system (e.g., the data processing system 315) can receive data from an access control device (e.g., the access control device 110). The data processing system can receive an address from the access control device. The address can be a static or dynamic address. The address can be a MAC address. The data processing system can receive the address from the access control device via a wired connection (e.g., the wired connection 210). The data processing system can receive the address from the access control device via a wireless connection. The data processing system can receive the address from the access control device via a jig (e.g., the jig 215). The data processing system can receive the address over a serial connection (e.g., the serial connection 360) and a USB connection (e.g., the USB connection 310).

At ACT 1110, the method 1100 can include a data processing system receiving sensor data. The data processing system (e.g., the data processing system 315) can receive the sensor data from a sensor (e.g., the sensor 125). The data processing system can receive an address from the sensor. The address can be a static or dynamic address. The address can be a MAC address. The sensor can be a sensor of an electric vehicle (e.g., the electric vehicle 105). The sensor can be a wireless module that communicates with an access control device (e.g., the access control device 110) of the electric vehicle. The data processing system can receive the address from the sensor via a wired connection (e.g., the wired connection 220). The data processing system can receive the address from the sensor via a wireless connection. The data processing system can receive the address from the sensor via an Ethernet connection (e.g., the Ethernet connection 325) between the data processing system and a telematics system (e.g., the telematics system 330) of the electric vehicle. The telematics system 330 can receive the address from the sensor via an Ethernet connection (e.g., the Ethernet connection 350) between the telematics system 330 and an ECU gateway (e.g., the ECU gateway 340) and a CAN bus (e.g., the CAN bus 355) between the ECU gateway and the sensor.

At ACT 1115, the method 1100 can include a data processing system generating a pairing data bundle. The data processing system (e.g., the data processing system 315) can generate a first pairing data bundle (e.g., the first pairing data bundle 235) for an access control device (e.g., the access control device 110). The data processing system can generate a second pairing data bundle (e.g., the second pairing data bundle 240) for a sensor (e.g., the sensor 125). The data processing system can generate the first pairing data bundle to include the data received at ACT 1110. For example, the data processing system can generate the first pairing data bundle to include an address of a sensor (e.g., the sensor 125). Furthermore, the data processing system can generate an encryption key for an access control device and an encryption key for a sensor. The data processing system can generate the first pairing data bundle to include the encryption key of the access control device and the encryption key of the sensor. The data processing system can generate the second pairing data bundle to include the data received at ACT 1105. The data processing system can generate the second pairing data bundle to include an address of the sensor. The data processing system can generate the second pairing data bundle to include the encryption key of the access control device and the encryption key of the sensor.

At ACT 1120, the method 1100 can include a data processing system transmitting a pairing data bundle. The data processing system (e.g., the data processing system 315) can transmit the first pairing data bundle (e.g., the first pairing data bundle 235) to the access control device (e.g., the access control device 110). Transmitting the first pairing data bundle to the access control device and transmitting a second pairing data bundle (e.g., the second pairing data bundle 240) to a sensor (e.g., the sensor 125) can pair the access control device with the sensor. The access control device can use the first pairing data bundle to wirelessly communicate with the sensor (e.g., based on an encryption key of the access control device or the sensor or an address of the access control device or the sensor). The data processing system can transmit the pairing data bundle to the access control device via a wired connection (e.g., the wired connection 210) or a wireless connection. The data processing system can transmit the pairing data bundle to the access control device via a jig (e.g., jig 215) that holds the access control device. The data processing system can transmit the second pairing data bundle (e.g., the second pairing data bundle 240) to the sensor (e.g., the sensor 125). Transmitting the second pairing data bundle to the sensor and transmitting a first pairing data bundle (e.g., the first pairing data bundle 235) to an access control device (e.g., the access control device 110) can pair the sensor with the access control device. Transmitting the second pairing data bundle to the sensor can cause the sensor to store the second pairing data bundle. The access control device can use the second pairing data bundle to wirelessly communicate with the access control device (e.g., based on an encryption key of the sensor or the access control device or an address of the sensor or the access control device). The data processing system can transmit the pairing data bundle to the sensor via a wired connection (e.g., the wired connection 220) or a wireless connection. The data processing system can transmit the pairing data bundle to the sensor via an Ethernet connection (e.g., the Ethernet connection 325) between the pairing tool 205 and the electric vehicle 105, an Ethernet connection (e.g., the Ethernet connection 350) between a telematics system (e.g., telematics system 330) and an ECU gateway (e.g., the ECU gateway 340), and a CAN bus (e.g., the Can bus 355) between the ECU gateway and the sensor.

At ACT 1130, the method 1100 can include a data processing system testing a pairing. The data processing system (e.g., the data processing system 315) can test a pairing between a sensor (e.g., the sensor 125) and an access control device (e.g., the access control device 110). The data processing system can test the pairing between the sensor and the access control device responsive to transmitting a first pairing data bundle (e.g., the first pairing data bundle 235) to the access control device and transmitting a second pairing data bundle (e.g., the second pairing data bundle 240) to the sensor. Before testing the pairing, the data processing system can power cycle the sensor and the access control device. The data processing system can perform the test by causing the access control device to communicate a command to operate a component of an electric vehicle (e.g., the electric vehicle 105) to the sensor of the electric vehicle. The command can be transmitted by the data processing system via a wired connection 210. For example, the data processing system can transmit the command via a USB connect (e.g., the USB connection 310) between the data processing system and a jig that is holding the access control device (e.g., the jig 215) and a serial connection (e.g., the serial connection 360) between a data processing system (e.g., data processing system 305) of the jig and the access control device.

Based on the pairing data bundle stored by the access control device, the access control device can wirelessly transmit the command to the sensor. The sensor can receive the command via the pairing data bundle stored by the sensor. The sensor can transmit the command to other systems of the electric vehicle that can operate components of the electric vehicle based on the command. The data processing system can read a status from the electric vehicle. The status can indicate whether the electric vehicle performed the command. The data processing system can read the status via an Ethernet connection (e.g., the Ethernet connection 325) between the data processing system and a telematics system (e.g., the telematics system 330) of the electric vehicle. Responsive to determining that the status indicates that the command was performed, the data processing system can generate a report indicating that the pairing of the access control device with the sensor was successful. Responsive to determining that the status indicates that the command was not performed, the data processing system can generate a report indicating that the pairing of the access control device with the sensor was unsuccessful.

Figure 12:
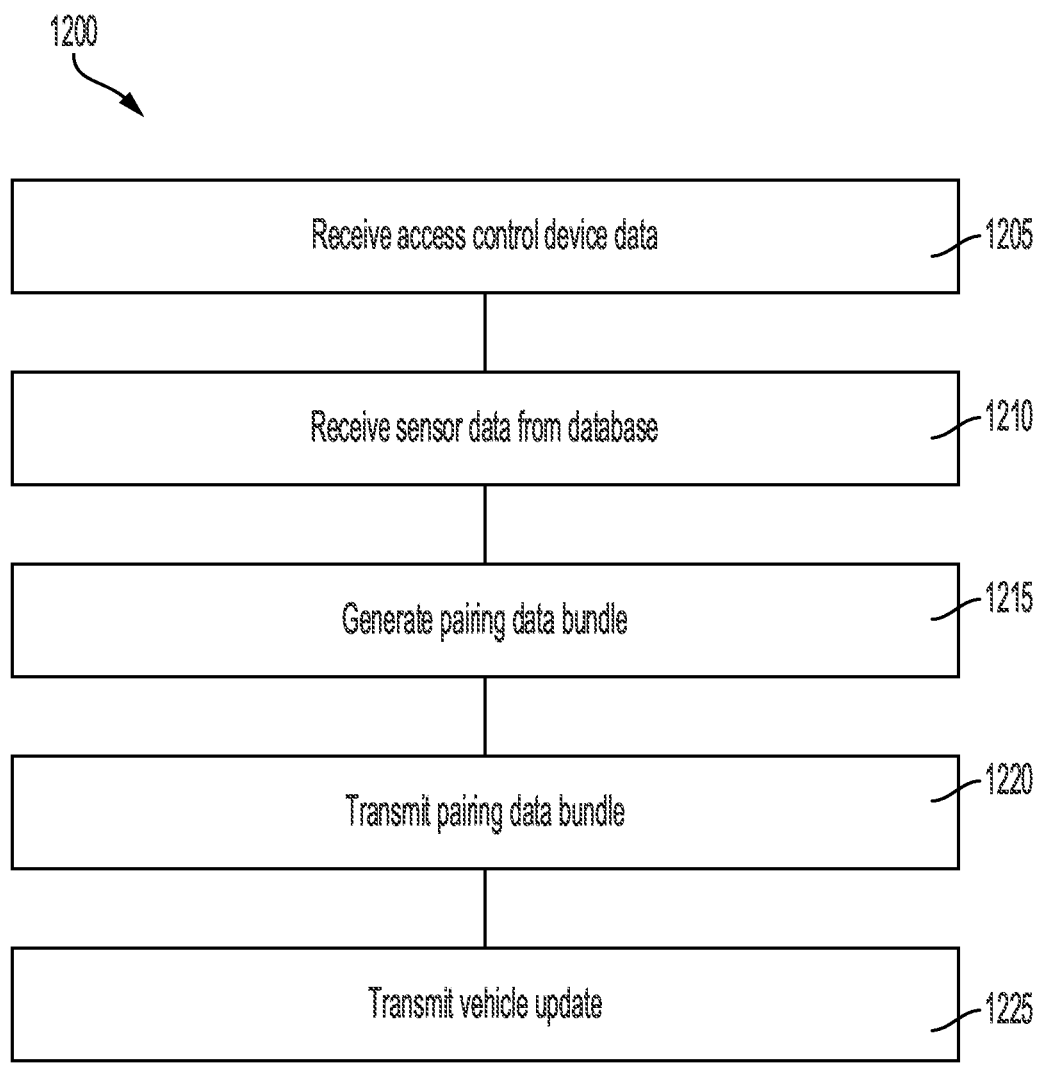
FIG. 12 is a flow diagram illustrating an example method of pairing the access control device with an electric vehicle based on an update.

FIG. 12 is a flow diagram illustrating an example method 1200 of pairing the access control device 110 with an electric vehicle 105 based on an update. The method 1200 can be performed by one or more systems or components depicted in FIGS. 1-10. For example, the remote data processing system 410 can perform the method 1200. The data processing system 315 can perform the method 1200. Furthermore, any computing system or device described herein can perform the method 1200. The method can include any of ACTS 1202-1225. The ACTS 1102-1130 can be performed in various orders and are not limited to the order shown in FIG. 12. ACT 1205 receives access control device data. ACT 1210 receives sensor data from a database. ACT 1215 generates a pairing data bundle. ACT 1220 transmits a pairing data bundle. ACT 1225 transmits a vehicle update.

At ACT 1205, the method 1200 can include a data processing system receiving access control device data of. A remote data processing system (e.g., the remote data processing system 410) can receive data of the access control device (e.g., the access control device 415). The remote data processing system can receive the data from the access control device 415 via a wired connection (e.g., the wired connection 210) or a jig that the access control device is placed in (e.g., the jig 215). The access control device can be a replacement access control device for a deployed electric vehicle (e.g., the electric vehicle 105) when an old access control device may be lost or broken. The access control device can be a new access control device for a new driver of the electric vehicle, e.g., an owner of the electric vehicle may wish to have an additional access control device for a family member. The data received by the remote data processing system can include an address of the access control device.

At ACT 1210, the method 1200 can include a data processing system receiving sensor from a database. A remote data processing system (e.g., the remote data processing system 410) can retrieve data of a sensor (e.g., the sensor 125 of the electric vehicle 105) from a historic records database (e.g., the historic records database 405). The remote data processing system can retrieve an address of the sensor from the database. The remote data processing system can retrieve the address with an identifier of the electric vehicle.

At ACT 1215, the method 1200 can include a data processing system generating a pairing data bundle. A remote data processing system (e.g., the remote data processing system 410) can generate a pairing data bundle (e.g., the pairing data bundle 440) for the access control device (e.g., the access control device 415). The pairing data bundle for the access control device can include an address of the sensor received at ACT 1210. The pairing data bundle can generate an encryption key for the access control device and an encryption key for the sensor. The pairing data bundle for the access control device can include the encryption key of the access control device. The pairing data bundle for the access control device can include the encryption key for the sensor. The remote data processing system can generate an update. The update can include a pairing data bundle for the sensor. The remote data processing system can cause the pairing data bundle for the sensor to include an address of the access control device received at ACT 1205. The remote data processing system can cause the pairing data bundle for the sensor to include the encryption key for the access control device. The remote data processing system can cause the pairing data bundle for the sensor to include the encryption key for the sensor.

At ACT 1220, the method 1200 can include a data processing system transmitting a pairing data bundle. A remote data processing system (e.g., the remote data processing system 410) can transmit the pairing data bundle (e.g., the pairing data bundle 440) to an access control device (e.g., the access control device 415). The remote data processing system can transmit the pairing data bundle to the access control device via a wireless or wired connection (e.g., the wired connection 210). The access control device can store the pairing data bundle responsive to receiving the pairing data bundle from the remote data processing system.

At ACT 1225, the method 1200 can include a data processing system transmitting a vehicle update. A remote data processing system (e.g., the remote data processing system 410) can transmit the update (e.g., the update 445) to an electric vehicle (e.g., the electric vehicle 105). The remote data processing can transmit the update 445 as an over the air update communicated over one or more networks (e.g., the communication networks 425) to the electric vehicle. Responsive to receiving the update, the electric vehicle can implement or install the update. Implementing or installing the update can include causing, by the electric vehicle, a sensor (e.g., the sensor 125) to store the pairing data bundle of the update. Responsive to the access control device and the sensor storing their respective pairing data bundles, the access control device and the sensor may be paired.

FIG. 13 depicts an example block diagram of an example of the data processing system 315. The data processing system 315 can include or be used to implement a data processing system or its components. The data processing system 315 includes at least one bus 1330 or other communication component for communicating information and at least one processor 1345 or processing circuit coupled to the bus 1330 for processing information. The data processing system 315 can also include one or more processors 1345 or processing circuits coupled to the bus for processing information. The data processing system 315 also includes at least one main memory 1315, such as a random access memory (RAM) or other dynamic storage device, coupled to the bus 1330 for storing information, and instructions to be executed by the processor 1345. The main memory 1315 can be used for storing information during execution of instructions by the processor 1345. The data processing system 315 may further include at least one read only memory (ROM) 1320 or other static storage device coupled to the bus 1330 for storing static information and instructions for the processor 1345. A storage device 1325, such as a solid state device, magnetic disk or optical disk, can be coupled to the bus 1330 to persistently store information and instructions.

The data processing system 315 may be coupled via the bus 1330 to a display 1305 of the user interface 320, such as a liquid crystal display, or active matrix display, for displaying information to a user such as a driver of the electric vehicle 105 or other end user. An input device 1310, such as a keyboard or voice interface may be coupled to the bus 1330 for communicating information and commands to the processor 1345. The input device 1310 can include a touch screen display 1305. The input device 1310 can also include a cursor control, such as a mouse, a trackball, or cursor direction keys, for communicating direction information and command selections to the processor 1345 and for controlling cursor movement on the display 1305.

The processes, systems and methods described herein can be implemented by the data processing system 315 in response to the processor 1345 executing an arrangement of instructions contained in main memory 1315. Such instructions can be read into main memory 1315 from another computer-readable medium, such as the storage device 1325. Execution of the arrangement of instructions contained in main memory 1315 causes the data processing system 315 to perform the illustrative processes described herein. One or more processors in a multi-processing arrangement may also be employed to execute the instructions contained in main memory 1315. Hard-wired circuitry can be used in place of or in combination with software instructions together with the systems and methods described herein. Systems and methods described herein are not limited to any specific combination of hardware circuitry and software.

Although an example computing system has been described in FIG. 13, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture.

The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, the systems and methods described herein can be applied to various Bluetooth devices. For example, an access control device could be paired with a charging station or charging component via the systems and methods described herein. For example, a charging station or charging component could be paired with an electric vehicle via the systems and methods described herein. For example, one or more components of an electric vehicle could pair with each other via the systems and methods described herein. For example, a door lock, headlights, a tailgate, or another vehicle component could pair with a data processing system of the electric vehicle such that the data processing system can operate the components via wireless communication based on the pairing. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A manufacturing system for vehicles, comprising:
a data processing system comprising one or more processors, coupled to memory, to:
generate a first pairing data bundle for an access control device of a vehicle;
generate a second pairing data bundle for a sensor of the vehicle;
generate an encryption key for the sensor and generate an encryption key of the access control device;
cause the first pairing data bundle to include the encryption key for the sensor to be stored on the access control device;
cause the second pairing data bundle to include the encryption key for the access control device to be stored on the sensor; and
transmit the first pairing data bundle to the access control device and transmit the second pairing data bundle to the sensor to pair the access control device with the sensor based on the encryption key for the sensor transmitted to the access control device and the encryption key for the access control device transmitted to the sensor;
wherein the access control device is paired with the sensor without wirelessly pairing between the access control device and the sensor.

2. The manufacturing system of claim 1, wherein the sensor is a first sensor, comprising:
the first pairing data bundle including the encryption key of the first sensor, an address of the first sensor, an encryption key of a second sensor, and an address of the second sensor; and
the second pairing data bundle including the encryption key of the access control device and an address of the access control device.

3. The manufacturing system of claim 1, comprising:
the first pairing data bundle including the encryption key of the access control device and the second pairing data bundle comprising the encryption key of the sensor.

4. The manufacturing system of claim 1, comprising the data processing system to:
transmit the first pairing data bundle to the access control device to store the first pairing data bundle on the access control device; and
transmit the second pairing data bundle to the sensor to store the second pairing data bundle on the sensor.

5. The manufacturing system of claim 1, comprising:
the access control device configured to wirelessly send a command to operate a component of the vehicle to the sensor via a pairing between the access control device and the sensor.

6. The manufacturing system of claim 1, comprising the data processing system to:
communicate, via a first wired connection, with the access control device to store the first pairing data bundle on the access control device; and
communicate, via a second wired connection, with the sensor to store the second pairing data bundle on the sensor.

7. The manufacturing system of claim 1, comprising:
the sensor configured to wirelessly communicate with the access control device via a wireless communication protocol.

8. The manufacturing system of claim 1, comprising the data processing system to:
communicate, via a wired connection, with the access control device to cause the access control device to wirelessly send a command to the sensor;
determine, via a second wired connection, a status of the vehicle; and
determine, based on the status of the vehicle, that the command was performed and that the access control device is paired with the sensor.

9. The manufacturing system of claim 1, wherein the access control device is paired with the sensor without wirelessly pairing between the access control device and the sensor.

10. The manufacturing system of claim 1, wherein the sensor is a first sensor, comprising the data processing system to:
generate an encryption key for a second sensor of the vehicle; and
cause the first pairing data bundle to include the encryption key for the second sensor.

11. The manufacturing system of claim 1, comprising the data processing system to:
determine, via a first wired connection, an address of the access control device;
determine, via a second wired connection, an address of the sensor;
cause a first data packet to include the address of the sensor; and
cause a second data packet to include the address of the access control device.

12. The manufacturing system of claim 1 wherein the sensor is a first sensor, comprising the data processing system to:
determine, via a second wired connection, an address of a second sensor of the vehicle; and
cause a first data packet to include the address of the second sensor of the vehicle.

13. The manufacturing system of claim 1, comprising:
an access control device jig, comprising:
a plurality of mechanical components structured to hold the access control device; and
an electrical connector to form a connection with a contact of the access control device.

14. The manufacturing system of claim 1, comprising the data processing system to:
store the first pairing data bundle on the access control device via a connection formed by an electrical connector with a contact of the access control device.

15. The manufacturing system of claim 1, comprising:
an access control device jig comprising:
an electrical connector forming a connection with a contact of the access control device to power the access control device.

16. A method, comprising:
generating, by a data processing system of a manufacturing system for manufacturing vehicles, the data processing system including one or more processors coupled to memory, a first pairing data bundle for an access control device of a vehicle;
generating, by the data processing system, a second pairing data bundle for a sensor of the vehicle;
determining, via a first wired connection, an address of the access control device;
determining, via a second wired connection, an address of the sensor;
causing a first data packet to include the address of the sensor to be stored on the access control device;
cause a second data packet to include the address of the access control device to be stored on the sensor; and
transmitting, by the data processing system, the first pairing data bundle to the access control device and transmit the second pairing data bundle to the sensor to pair the access control device with the sensor based on the encryption key for the sensor transmitted to the access control device and the encryption key for the access control device transmitted to the sensor;
wherein the access control device is paired with the sensor without wirelessly pairing between the access control device and the sensor.

17. The method of claim 16, comprising:
transmitting, by the data processing system, the first pairing data bundle to the access control device to store the first pairing data bundle on the access control device; and
transmitting, by the data processing system, the second pairing data bundle to the sensor to store the second pairing data bundle on the sensor.

18. A system, comprising:
a data processing system comprising one or more processors, coupled to memory, to:
generate a first pairing data bundle and a second pairing data bundle;
generate an encryption key for a sensor and generate an encryption key of an access control device;
cause the first pairing data bundle to include the encryption key for the sensor to be stored on the access control device;
cause the second pairing data bundle to include the encryption key for the access control device to be stored on the sensor;
transmit the first pairing data bundle to the access control device; and
transmit an update including the second pairing data bundle to a vehicle to locally store the second pairing data bundle on the vehicle to pair the sensor with the access control device based on the encryption key for the sensor transmitted to the access control device and the encryption key for the access control device transmitted to the sensor;
wherein the access control device is paired with the sensor without wirelessly pairing between the access control device and the sensor.

19. The system of claim 18, comprising:
a database that stores an address of the sensor read from the vehicle during a manufacturing process of the vehicle;
retrieve the address from the database; and
cause the first pairing data bundle to include the address.

* * * * *